United States Patent
Bae

(10) Patent No.: US 10,163,564 B2
(45) Date of Patent: Dec. 25, 2018

(54) WIRELESS POWER TRANSMITTER AND METHOD OF CONTROLLING POWER THEREOF

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 577 days.

(21) Appl. No.: 14/038,292

(22) Filed: Sep. 26, 2013

(65) Prior Publication Data

US 2014/0084701 A1    Mar. 27, 2014

(30) Foreign Application Priority Data

Sep. 26, 2012 (KR) .................. 10-2012-0107450

(51) Int. Cl.
| | |
|---|---|
| *H01F 38/14* | (2006.01) |
| *H02J 50/80* | (2016.01) |
| *H02J 50/90* | (2016.01) |
| *H02J 50/12* | (2016.01) |
| *H02J 5/00* | (2016.01) |
| *H02J 7/02* | (2016.01) |

(52) U.S. Cl.
CPC .............. *H01F 38/14* (2013.01); *H02J 5/005* (2013.01); *H02J 7/025* (2013.01); *H02J 50/12* (2016.02); *H02J 50/80* (2016.02); *H02J 50/90* (2016.02)

(58) Field of Classification Search
CPC .................... H01F 38/14; H02J 7/025
See application file for complete search history.

(56) References Cited

U.S. PATENT DOCUMENTS

| | | | | |
|---|---|---|---|---|
| 4,639,714 A | * | 1/1987 | Crowe ................... | H04B 3/548 340/12.33 |
| 8,716,900 B2 | * | 5/2014 | Kanno .................... | H01F 38/14 307/104 |
| 2009/0033280 A1 | | 2/2009 | Choi | |

(Continued)

FOREIGN PATENT DOCUMENTS

| | | |
|---|---|---|
| CN | 102082469 A | 6/2011 |
| EP | 2421121 A1 | 2/2012 |

(Continued)

OTHER PUBLICATIONS

Waters, "Adaptive Impedance Matching for Magnetically Coupled Resonator," Aug. 19-23, 2012, Piers Proceedings, Moscow, Russia, pp. 694-701.*

(Continued)

*Primary Examiner* — Thienvu Tran
*Assistant Examiner* — Pinping Sun
(74) *Attorney, Agent, or Firm* — Saliwanchik, Lloyd & Eisenschenk

(57) ABSTRACT

Disclosed are a wireless power transmitter and a method of controlling power thereof. A wireless power transmitter includes a power supply device to supply AC power to the wireless power transmitter; and a transmission coil to transmit the AC power to a reception coil of a wireless power receiver by resonance. The wireless power transmitter controls transmission power to be transmitted to the wireless power receiver based on a coupling state between the transmission coil and the reception coil.

16 Claims, 13 Drawing Sheets

(56) References Cited

U.S. PATENT DOCUMENTS

| | | | | |
|---|---|---|---|---|
| 2009/0127937 A1* | 5/2009 | Widmer | ............... | H01F 38/14 307/149 |
| 2009/0271048 A1* | 10/2009 | Wakamatsu | ............ | G06F 1/266 700/296 |
| 2010/0187913 A1* | 7/2010 | Smith | ............... | H02J 5/005 307/104 |
| 2011/0127846 A1 | 6/2011 | Urano | | |
| 2011/0254503 A1* | 10/2011 | Widmer | ............ | B60L 11/182 320/108 |
| 2012/0049861 A1 | 3/2012 | Kim et al. | | |
| 2012/0086281 A1* | 4/2012 | Kanno | ............... | H02J 5/005 307/82 |
| 2012/0098348 A1* | 4/2012 | Inoue | ............... | B60L 11/123 307/104 |
| 2012/0146425 A1* | 6/2012 | Lee | ............... | H02J 5/005 307/104 |
| 2012/0149307 A1* | 6/2012 | Terada | ............... | H02J 7/025 455/66.1 |
| 2012/0187771 A1 | 7/2012 | Kamata et al. | | |
| 2012/0217926 A1* | 8/2012 | Yoon | ............... | H02J 7/025 320/108 |
| 2012/0306265 A1 | 12/2012 | Yamamoto et al. | | |
| 2015/0207331 A1* | 7/2015 | Petersen | ............... | H02J 17/00 307/104 |

FOREIGN PATENT DOCUMENTS

| | | | | |
|---|---|---|---|---|
| JP | 2009-268311 A | 11/2009 | | |
| JP | 2010-252446 A | 11/2010 | | |
| JP | 2011-045161 A | 3/2011 | | |
| JP | 2011-166994 A | 8/2011 | | |
| JP | 2011-199975 A | 10/2011 | | |
| KR | 2007-0078889 | 8/2007 | | |
| WO | WO-2009-014125 | 1/2009 | | |
| WO | WO 2012093057 A1 * | 7/2012 | ......... | H04W 52/146 |

OTHER PUBLICATIONS

Office Action dated Oct. 6, 2014 in Korean Application No. 10-2012-0107450.

European Search Report dated Dec. 16, 2015 in European Application No. 13184867.3.

Office Action dated Feb. 27, 2015 in Chinese Application No. 201310445293.X.

Office Action dated Sep. 9, 2014 in Japanese Application No. 2013-200196.

Office Action dated Dec. 7, 2017 in Korean Application No. 10-2014-0035995.

Office Action dated Jan. 27, 2014 in Korean Application No. 10-2012-0107450.

* cited by examiner

| current value in application of 1st output voltage | coupling coefficient | 2nd output voltage | preferable current range |
|---|---|---|---|
| 130~160mA | 0.0408 | 18V | 501~550mA |
| 100~130mA | 0.0352 | 20V | 551~600mA |
| 80~100mA | 0.0290 | 22V | 601~650mA |
| 60~80mA | 0.0247 | 24V | 651~700mA |
| 50~60mA | 0.0203 | 26V | 701~750mA |
| 30~50mA | 0.0175 | 28V | 751~800mA |
| 30mA이하 | 0.0152 | 30V | 801~850mA |

FIG.17

| distance | input test current | coupling coefficient | load impedance | reception power | transmission power efficiency | transmission power |
|---|---|---|---|---|---|---|
| 0mm | 160mA | 0.0408 | 5Ω | 5W | 80% | 6.25W |
| 5mm | 130mA | 0.0352 | 6Ω | 4.2W | 72% | 5.83W |
| 10mm | 100mA | 0.0290 | 7.3Ω | 3.5W | 65% | 5.38W |
| 15mm | 80mA | 0.0247 | 8.5Ω | 2.6W | 58% | 4.48W |
| 20mm | 60mA | 0.0203 | 10Ω | 2.1W | 50% | 4.20W |
| 25mm | 50mA | 0.0175 | 11.6Ω | 1.6W | 42% | 3.81W |
| 30mm | 30mA | 0.0152 | 13.3Ω | 1.2W | 35% | 3.43W |

WIRELESS POWER TRANSMITTER AND METHOD OF CONTROLLING POWER THEREOF

CROSS-REFERENCE TO RELATED APPLICATION

This application claims the benefit under 35 U.S.C. § 119 of Korean Patent Application No. 10-2012-0107450, filed Sep. 26, 2012, which is hereby incorporated by reference in its entirety.

BACKGROUND

The embodiment relates to a wireless power transmission technology. More particularly, the disclosure relates to a method of controlling transmission power depending on the coupling states between a wireless power transmitter and a wireless power receiver to maximize the power transmission efficiency.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance thereof is short.

Until now, wireless energy transmission schemes include a remote telecommunication technology based on magnetic resonance and a short wave radio frequency in addition to the electromagnetic induction.

Recently, among wireless power transmitting technologies, an energy transmitting scheme employing resonance has been widely used.

However, according to the energy transmitting scheme employing resonance according to the related art, the power transmission efficiency may be varied depending on the coupling states between the wireless power transmitter and the wireless power receiver.

Therefore, a scheme of maximizing the power transmission efficiency by reflecting the coupling state between the wireless power transmitter and the wireless power receiver is required.

BRIEF SUMMARY

The embodiment provides a method of maximizing the power transmission efficiency depending on the coupling state between a wireless power transmitter and a wireless power receiver.

The embodiment provides a method of controlling the transmission power depending on a coupling coefficient between a wireless power transmitter and a wireless power receiver by detecting the coupling coefficient between the wireless power transmitter and the wireless power receiver.

According to one embodiment, there is provided a wireless power transmitter to transmit power to a load through a wireless power receiver. The wireless power transmitter includes a power supply unit to supply AC power to the wireless power transmitter, and a transmission coil to transmit the AC power to a reception coil of a wireless power receiver by resonance. The wireless power transmitter controls transmission power to be transmitted to the wireless power receiver based on a coupling state between the transmission coil and the reception coil.

According to one embodiment, a method of controlling power of a wireless power transmitter to transmit the power to a load through a wireless power receiver includes detecting a coupling state between the wireless power transmitter and the wireless power receiver, adjusting transmission power based on the coupling state, and transmitting the adjusted transmission power to the load by resonance.

As described above, there can be provided a method of maximizing the power transmission efficiency by controlling transmission power according to the coupling state between the wireless power transmitter and the wireless power receiver.

According to the embodiment, the coupling coefficient between the wireless power transmitter and the wireless power receiver is detected and the optimal reception power is determined based on the coupling coefficient. The power transmission efficiency can be maximized by controlling the transmission power according to the determined reception power.

Meanwhile, any other various effects will be directly and implicitly described below in the description of the embodiment.

BRIEF DESCRIPTION OF THE DRAWINGS

FIG. 17 is a view to explain a look-up table used in the method of controlling power according to the embodiment of FIG. 16.

DETAILED DESCRIPTION

Hereinafter, embodiments will be described in detail with reference to accompanying drawings so that those skilled in the art can easily work with the embodiments.

According to the present invention, a scheme of transmitting power through electromagnetic induction may signify a tightly coupling scheme having a relatively low Q value, and a scheme of transmitting power through resonance may signify a loosely coupling scheme having a relatively high Q value.

According to one embodiment, the frequency band used for power transmission in the tightly coupling scheme may be in the range of 100 kHz to 300 kHz, and the frequency band used for power transmission in the loosely coupling scheme may be one of 6.78 MHz and 13.56 MHz. However, the above numeric values are provided for the illustrative purpose.

In addition, the loosely coupling scheme of transmitting power through resonance according to the embodiment may include a directly coupling scheme and an inductively coupling scheme.

According to the directly coupling scheme, each of a wireless power transmitter and a wireless power receiver directly performs power transmission by using one resonant coil. According to the inductively coupling scheme, a wireless power transmitter transmits power to a wireless power receiver including two reception coils through two transmission coils.

Figure 1:
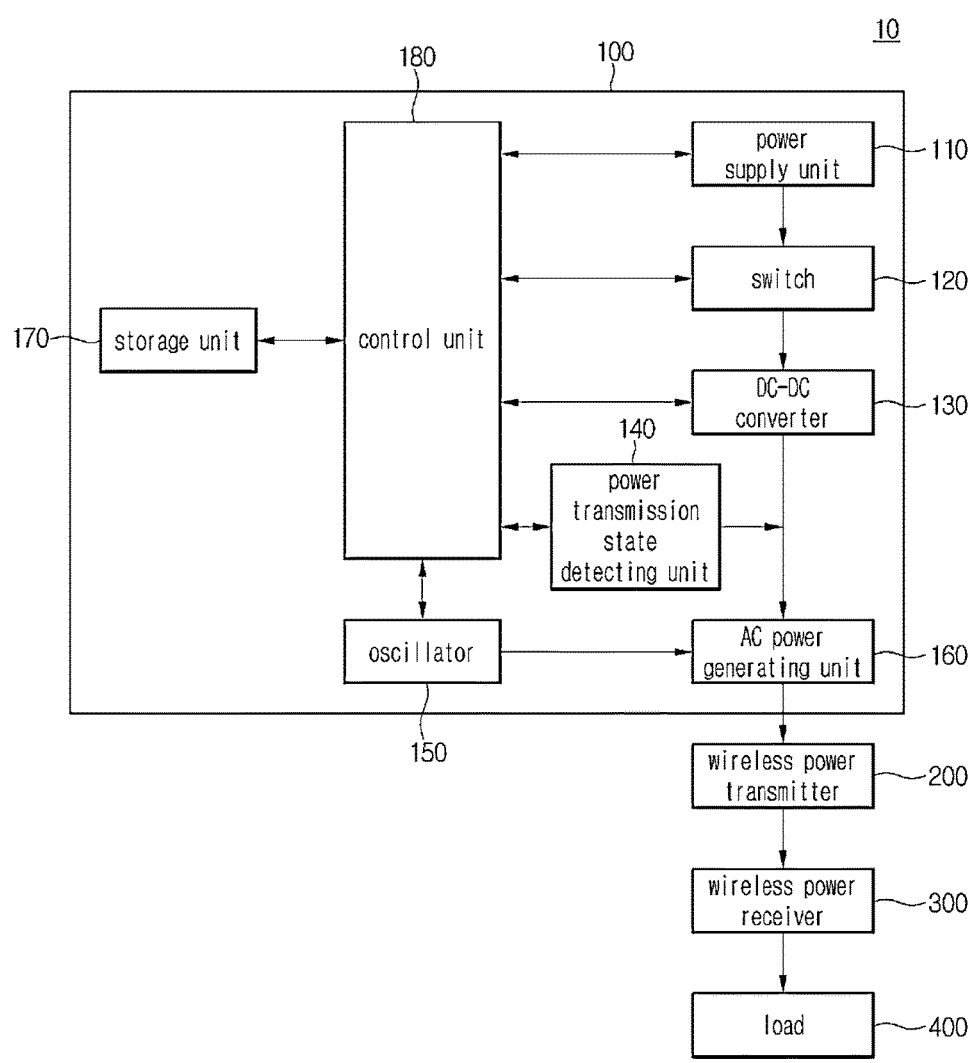
FIG. 1 is a block diagram showing the structure of a wireless power transmission system according to one embodiment.
Figure 2:
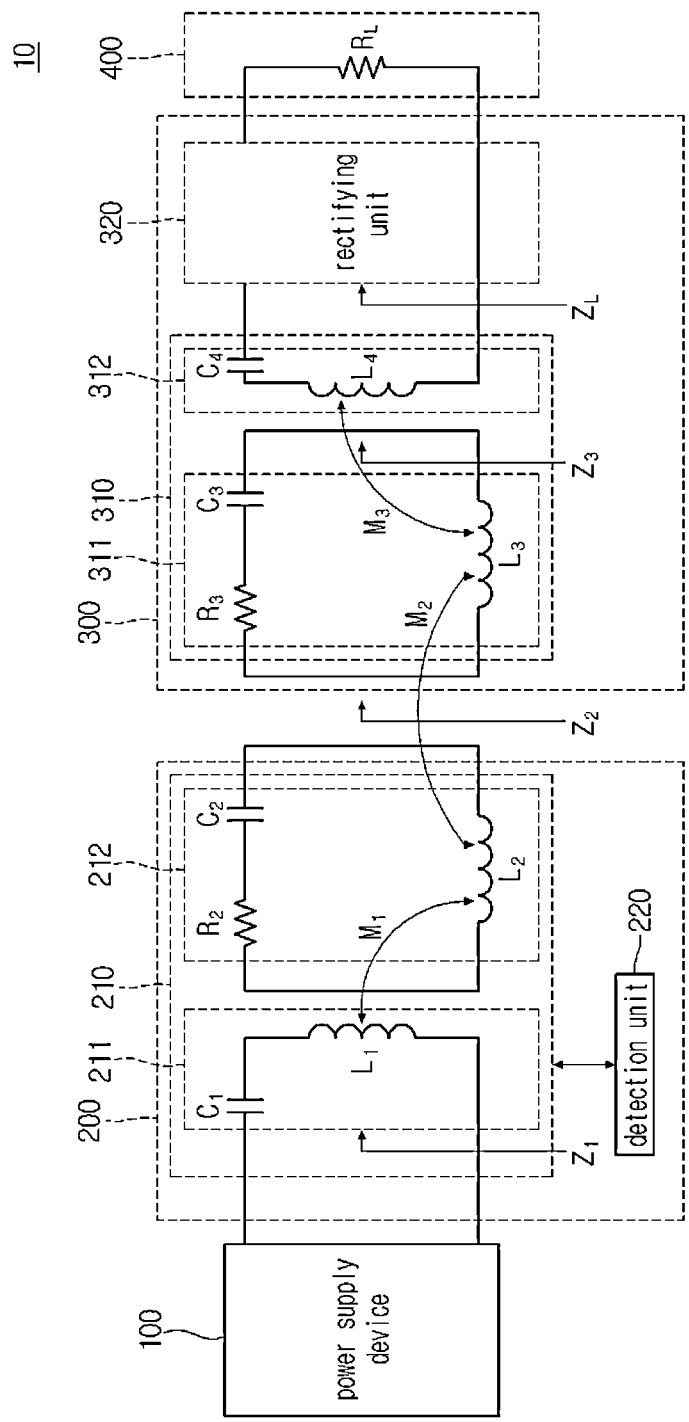
FIG. 2 is an equivalent circuit diagram showing the wireless power transmission system according to one embodiment.

FIG. 1 is a block diagram showing the structure of a wireless power transmission system 10 according to one embodiment, and FIG. 2 is an equivalent circuit diagram showing the wireless power transmission system 10 according to one embodiment.

Referring to FIG. 1, the wireless power transmission system 10 may include a power supply device 100, a wireless power transmitter 200, a wireless power receiver 300, and a load 400.

According to one embodiment, the power supply device 100 may be provided separately from the wireless power transmitter 200 as shown in FIG. 1 or may be included in the wireless power transmitter 200.

Referring to FIG. 1, the power supply device 100 may include a power supply unit 110, a switch 120, a DC-DC converter 130, a power transmission state detecting unit 140, an oscillator 150, an AC power generating unit 160, a control unit 180, and a storage unit 170.

The power supply unit 110 may supply DC power to each component of the power supply device 100. The power supply unit 110 may be provided separately from the power supply device 100.

According to one embodiment, the wireless power transmitter 200 may transmit power to the wireless power receiver 300 by using resonance. The transmission coil of the wireless power transmitter 200 may be realized based on the inductively coupling scheme by including a transmission induction coil unit 211 and a transmission resonant coil unit 212 to be described later, or may be realized based on the directly coupling scheme by including only one transmission induction coil unit 211. The switch 120 may connect the power supply unit 110 with the DC-DC converter 130, or disconnect the power supply unit 110 from the DC-DC converter 130. The switch 120 may be open or shorted by an open signal or a short signal of the control unit 180. According to one embodiment, the switch 120 may be open or shorted by the operation of the control unit 180 according to the power transmission state between the wireless power transmitter 200 and the wireless power receiver 300.

The DC-DC converter 130 may convert DC voltage, which is received from the power supply unit 110, into DC voltage having a predetermined voltage value to be output.

After converting the DC voltage received from the power supply unit 110 into AC voltage, the DC-DC converter 130 may boost up or drop down and rectify the converted AC voltage, and output the DC voltage having a predetermined voltage value.

The DC-DC converter 130 may include a switching regulator or a linear regulator.

The linear regulator is a converter to receive input voltage to output a required quantity of voltage and to discharge the remaining quantity of voltage as heat.

The switching regulator is a converter capable of adjusting output voltage through a pulse width modulation (PWM) scheme.

The power transmission state detecting unit 140 may detect the power transmission state between the wireless power transmitter 200 and the wireless power receiver 300. According to one embodiment, the power transmission state detecting unit 140 may detect the coupling state between the wireless power transmitter 200 and the wireless power receiver 300 by detecting the power transmission state. In this case, the coupling state may represent at least one of the distance between the wireless power transmitter 200 and the wireless power receiver 300 and the positions of the wireless power transmitter 200 and the wireless power receiver 300.

According to one embodiment, the power transmission state detecting unit 140 may detect the power transmission state based on current flowing in the power supply device 100. To this end, the power transmission state detecting unit 140 may include a current sensor. The current sensor may measure current flowing in the power supply device 100, and may detect the coupling state between the wireless power transmitter 200 and the wireless power receiver based on the current. The coupling state may be expressed as a coupling coefficient between the transmission resonant coil unit 212 of the wireless power transmitter 200 and a reception resonant coil unit 311 of the wireless power receiver 300.

According to one embodiment, the power transmission state detecting unit 140 may measure the intensity of current flowing when the DC voltage output from the DC-DC converter 130 is applied to the AC power generating unit 160, but the embodiment is not limited thereto. In other words, the power transmission state detecting unit 140 may measure the intensity of current output from the AC power generating unit 160.

According to one embodiment, the power transmission state detecting unit 140 may include a current transformer (CT). According to one embodiment, the intensity of current applied to the AC power generating unit may be used to find the distance between the wireless power transmitter 200 and the wireless power receiver 300. According to one embodiment, the intensity of the current applied to the AC power generating unit 160 may serve as an index to represent the coupling state between the wireless power transmitter 200 and the wireless power receiver 300. The power transmission state detecting unit 140 may transmit a signal representing the intensity of the detected current to the control unit 180.

Although FIG. 1 shows that the power transmission state detecting unit 140 is provided separately from the control unit 180, the power transmission state detecting unit 140 may be included in the control unit 180.

The oscillator 150 may generate an AC signal having a predetermined frequency and apply the AC signal to the AC power generating unit 160.

The AC power generating unit 160 may generate AC power by using the DC voltage received from the DC-DC converter 130 and the AC signal.

The AC power generating unit 160 may amplify the AC signal generated from the oscillator 150. An amount of an AC signal to be amplified may be varied depending on the intensity of the DC voltage through the DC-DC converter 130.

According to one embodiment, the AC power generating unit 160 may include a push-pull type dual MOSFET.

The control unit 180 may control the overall operation of the power supply device 100.

The control unit 180 may control the DC-DC converter 130 so that preset DC voltage is applied to the AC power generating unit 160.

The control unit 180 may receive a signal, which is related to the intensity of current flowing when the DC voltage output from the DC-DC converter 130 is applied to the AC power generating unit 160, from the power transmission state detecting unit 140, and adjust at least one of the DC voltage output from the DC-DC converter 130 and the frequency of the AC signal output from the oscillator 150 by using the signal related to the intensity of the received current.

The control unit 180 receives the signal representing the intensity of the current applied to the AC power generating unit 160 from the power transmission state detecting unit 140 to determine if the wireless power receiver 300 exists. In other words, the control unit 180 may determine the existence of the wireless power receiver 300 capable of receive power from the wireless power transmitter 200 based on the intensity of the current applied to the AC power generating unit 160.

The control unit 180 may control the oscillator 150 to generate an AC signal having a predetermined frequency. The predetermined frequency may refer to a resonance frequency of the wireless power transmitter 200 and the wireless power receiver 300 when the power transmission is performed by using resonance.

The storage unit 170 may store the intensity of the current applied to the AC power generating unit 160, the coupling coefficient between the wireless power transmitter 200 and the wireless power receiver 300, and the DC voltage output from the DC-DC converter 130 corresponding to each other. In other words, the storage unit 170 may store three values in the form of a look-up table.

The control unit 180 may search for a coupling coefficient corresponding to the intensity of the current applied to the AC power generating unit 160 and DC voltage output from the DC-DC converter 130 in the storage unit 170, and may control the DC-DC converter 130 so that the searched DC voltage may be output.

The wireless power transmitter 200 receives AC power from the AC power generating unit 160.

When the wireless power transmitter 200 is realized based on the inductively coupling scheme, the wireless power transmitter 200 may include the transmission induction coil unit 211 and the transmission resonant coil unit 212 constituting a transmission unit 210 shown in FIG. 2 to be described later.

When the wireless power transmitter 200 is realized based on the directly coupling scheme, the wireless power transmitter 200 may include only the transmission induction coil unit 211 among components of the transmission unit 210 shown in FIG. 2 to be described later.

The transmission resonant coil unit 212 may transmit the AC power received from the transmission induction coil unit 211 to the wireless power receiver 300 by using resonance. In this case, the wireless power receiver 300 may include the reception resonant coil $L_3$ and the reception induction coil $L_4$ shown in FIG. 2.

Referring to FIG. 2, the wireless power transmission system 10 may include a power supply device 100, the wireless power transmitter 200, the wireless power receiver 300, and the load 400.

The power supply device 100 includes all components described with reference to FIG. 1, and the components basically include the functions described with reference to FIG. 1.

The wireless power transmitter 200 may include the transmission unit 210 and a detection unit 220.

The transmission unit 210 may include the transmission induction coil unit 211 and the transmission resonant coil unit 212.

The AC power generated from the power supply device 100 is transmitted to the wireless power transmitter 200, and transmitted to the wireless power receiver 300 making resonance together with the wireless power transmitter 200. The power received in the wireless power receiver 300 is transmitted to the load 400 through a rectifying unit 320.

The load 400 may signify a rechargeable battery or other predetermined devices requiring power. According to the embodiment, the load impedance of the load 400 may be expressed as "$R_L$". According to one embodiment, the load 400 may be included in the wireless power receiver 300.

The power supply device 100 may supply AC power having a predetermined frequency to the wireless power transmitter 200. The power supply device 100 may supply AC power having a resonance frequency in resonance between the wireless power transmitter 200 and the wireless power receiver 300.

The transmission unit 210 may include the transmission induction coil unit 211 and the transmission resonant coil unit 212.

The transmission induction coil unit 211 is connected to the power supply device 100, and AC current flows through the transmission induction coil unit 211 by power received from the power supply device 100. If the AC current is flows through the transmission induction coil unit 211, the AC current is induced even to the transmission resonant coil unit 212 physically spaced apart from the transmission induction coil unit 211 due to electromagnetic induction. The power induced to the transmission resonant coil unit 212 is transmitted to the wireless power receiver 300 forming a resonant circuit together with the wireless power transmitter 200 through the resonance.

Power can be transmitted between two LC circuits, which are impedance-matched with each other, through resonance. Since the transmission resonant coil unit 212 is loosely coupled with the reception resonant coil unit 311, the power transmitted through the resonance can be farther transmitted when comparing with the power transmitted in the case of the tightly coupling scheme through the electromagnetic induction. Accordingly, the wireless power transmitter 200 and the wireless power receiver 300 have the higher alignment free degree so that the wireless power transmitter 200 and the wireless power receiver 300 transmit power with higher efficiency.

The transmission resonant coil unit 212 of the wireless power transmitter 200 may transmit power to the reception resonant coil unit 311 of the wireless power receiver 300 through a magnetic field.

In detail, the transmission resonant coil unit 212 and the reception resonant coil unit 311 are magnetically loosely coupled with each other.

Since the transmission resonant coil unit 212 is loosely coupled with the reception resonant coil unit 311, the power transmission efficiency between the wireless power transmitter 200 and the wireless power receiver 300 can be significantly improved.

The transmission induction coil unit 211 may include a transmission induction coil $L_1$ and a capacitor $C_1$. In this case, the capacitance of the capacitor $C_1$ is a value adjusted for the operation at the resonance frequency.

One terminal of the capacitor $C_1$ is connected to one terminal of the power supply device 100, and an opposite terminal of the capacitor $C_1$ is connected to one terminal of the transmission induction coil $L_1$. An opposite terminal of the transmission induction coil $L_1$ is connected to an opposite terminal of the power supply device 100.

The transmission resonant coil unit 212 includes a transmission resonant coil $L_2$, a capacitor $C_2$, and a resistor $R_2$. The transmission resonant coil $L_2$ includes one terminal connected to one terminal of the capacitor $C_2$ and an opposite terminal connected to one terminal of the resistor $R_2$. The opposite terminal of the resistor $R_2$ is connected to the opposite terminal of the capacitor $C_2$. The resistance of the resistor $R_2$ represents the quantity of power loss in the transmission resonant coil $L_2$, and the capacitance of the capacitor $C_2$ is a value adjusted for the operation at the resonance frequency.

The detection unit 220 may detect the coupling state between the wireless power transmitter 200 and the wireless power receiver 300. According to one embodiment, the coupling state may be detected based on the coupling coefficient between the transmission resonant coil unit 212 and the reception resonant coil unit 311. In this case, the detection unit 220 may detect the coupling coefficient by measuring the input impedance, and the detail thereof will be described later.

The wireless power receiver 300 may include a reception unit 310 and a rectifying unit 320.

The wireless power receiver 300 may be embedded in an electronic appliance such as a cellular phone, a mouse, a laptop computer, and an MP3 player.

The reception unit 310 may include a reception resonant coil unit 311 and a reception induction coil unit 312.

The reception resonant coil unit 311 includes a reception resonant coil $L_3$, a capacitor $C_3$, and a resistor $R_3$. The reception resonant coil $L_3$ includes one terminal connected to one terminal of the capacitor $C_3$ and an opposite terminal connected to one terminal of the resistor $R_3$. An opposite terminal of the resistor $R_3$ is connected to an opposite terminal of the capacitor $C_3$. The resistance of the resistor $R_3$ represents the quantity of power loss in the transmission resonant coil $L_3$, and the capacitance of the capacitor $C_3$ is a value adjusted for the operation at the resonance frequency.

The reception induction coil unit 312 includes a reception induction coil $L_4$ and a capacitor $C_4$. The reception resonant coil $L_4$ includes one terminal connected to one terminal of the capacitor $C_4$. An opposite terminal of the reception induction coil $L_4$ is connected to an opposite terminal of the rectifying unit 320. An opposite terminal of the capacitor $C_4$ is connected to one terminal of the rectifying unit 320.

The reception resonant coil unit 311 and the transmission resonant coil unit 212 maintain a resonance state at a resonance frequency. In other words, the reception resonant coil unit 311 and the transmission resonant coil unit 212 are resonance-coupled with each other so that AC current flows through the reception resonant coil unit 311. Accordingly, the reception resonant coil unit 311 may receive power from the wireless power transmitter 200 through a non-radiative scheme.

The reception induction coil unit 312 receives power from the reception resonant coil unit 311 through the electromagnetic induction, and the power received in the reception induction coil unit 312 is rectified by the rectifying unit 320 and sent to the load 400.

The rectifying unit 320 may receive the AC power from the reception induction coil unit 312 and convert the received AC power into DC power.

The rectifying unit 320 may include a rectifying circuit (not shown) and a smoothing circuit (not shown).

The rectifying circuit may include a diode and a capacitor to convert the AC power received from the reception induction coil unit 312 to DC power and sent the DC power to the load 400.

The smoothing circuit may smooth the rectified output. The smoothing circuit may include a capacitor.

The load 400 may receive the DC power rectified from the rectifying unit 320.

The load 400 may be a predetermined rechargeable battery or device requiring the DC power. For example, the load 400 may refer to a battery of a cellular phone, but the embodiment is not limited thereto.

According to one embodiment, the load 400 may be included in the wireless power receiver 300.

A quality factor and a coupling coefficient are important in the wireless power transmission.

The quality factor may refer to an index of energy that may be stored in the vicinity of the wireless power transmitter or the wireless power receiver.

The quality factor may be varied depending on the operating frequency ω as well as a shape, a dimension and a material of a coil. The quality factor may be expressed as following equation, $Q=\omega *L/R$. In the above equation, L refers to the inductance of a coil and R refers to resistance corresponding to the quantity of power loss caused in the coil.

The quality factor may have a value of 0 to infinity.

The coupling coefficient represents the degree of magnetic coupling between a transmission coil and a reception coil, and has a value in the range of 0 to 1.

The coupling coefficient may be varied depending on the relative position and distance between the transmission coil and the reception coil.

The wireless power transmitter 200 may interchange information with the wireless power receiver 300 through in-band communication or out-of-band communication.

The in-band communication refers to the communication for interchanging information between the wireless power transmitter 200 and the wireless power receiver 300 through a signal having the frequency used in the wireless power transmission. The wireless power receiver 300 may further include a switch and may receive or may not receive power transmitted from the wireless power transmitter 200 through a switching operation of the switch. Accordingly, the wireless power transmitter 200 can recognize an on-signal or an off-signal of the wireless power receiver 300 by detecting the quantity of power consumed in the wireless power transmitter 200.

In detail, the wireless power receiver 300 may change the power consumed in the wireless power transmitter 200 by adjusting the quantity of power absorbed in a resistor by using the resistor and the switch. The wireless power transmitter 200 may acquire the state information of the wireless power receiver 300 by detecting the variation of the power consumption. The switch may be connected to the resistor in series. According to one embodiment, the state information of the wireless power receiver 300 may include information about the present charge quantity and the change of the charge quantity in the wireless power receiver 300.

In more detail, if the switch is open, the power absorbed in the resistor becomes zero, and the power consumed in the wireless power transmitter 200 is reduced.

If the switch is short-circuited, the power absorbed in the resistor becomes greater than zero, and the power consumed in the wireless power transmitter 200 is increased. If the wireless power receiver repeats the above operation, the wireless power transmitter 200 detects power consumed therein to make digital communication with the wireless power receiver 300.

The wireless power transmitter 200 receives the state information of the wireless power receiver 300 through the above operation so that the wireless power transmitter 200 can transmit appropriate power.

To the contrary, the wireless power transmitter 200 may include a resistor and a switch to transmit the state information of the wireless power transmitter 200 to the wireless power receiver 300. According to one embodiment, the state information of the wireless power transmitter 200 may include information about the maximum quantity of power to be supplied from the wireless power transmitter 200, the number of wireless power receivers 300 receiving the power from the wireless power transmitter 200 and the quantity of available power of the wireless power transmitter 200.

The out-of-band communication refers to the communication performed through a specific frequency band other than the resonance frequency band in order to exchange information necessary for the power transmission. The wireless power transmitter 200 and the wireless power receiver 300 can be equipped with out-of-band communication modules to exchange information necessary for the power transmission. The out-of-band communication module may be installed in the power supply device. In one embodiment, the out-of-band communication module may use a short-distance communication technology, such as Bluetooth, Zigbee, WLAN or NFC, but the embodiment is not limited thereto.

Hereinafter, a method of controlling power according to one embodiment will be described in detail with reference to FIGS. 3 to 8.

Figure 3:
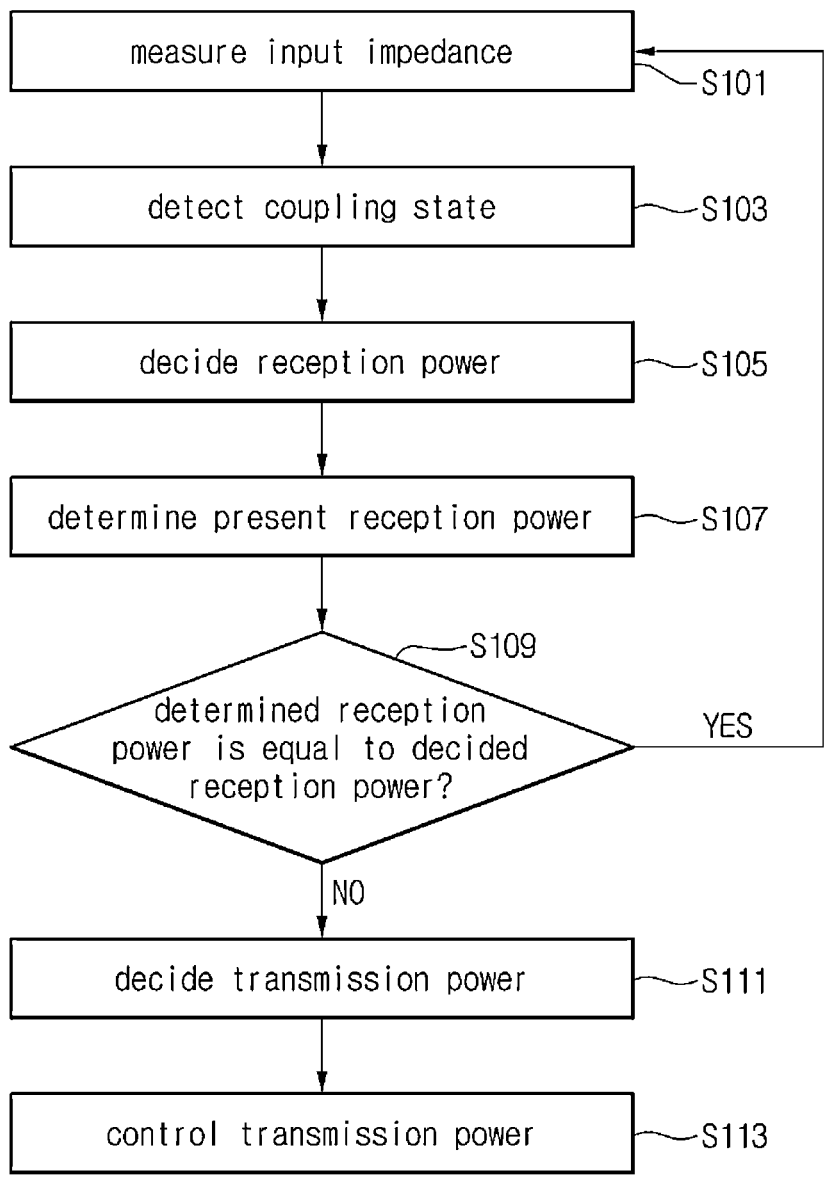
FIG. 3 is a flowchart to explain a method of controlling power according to one embodiment.
Figure 4:
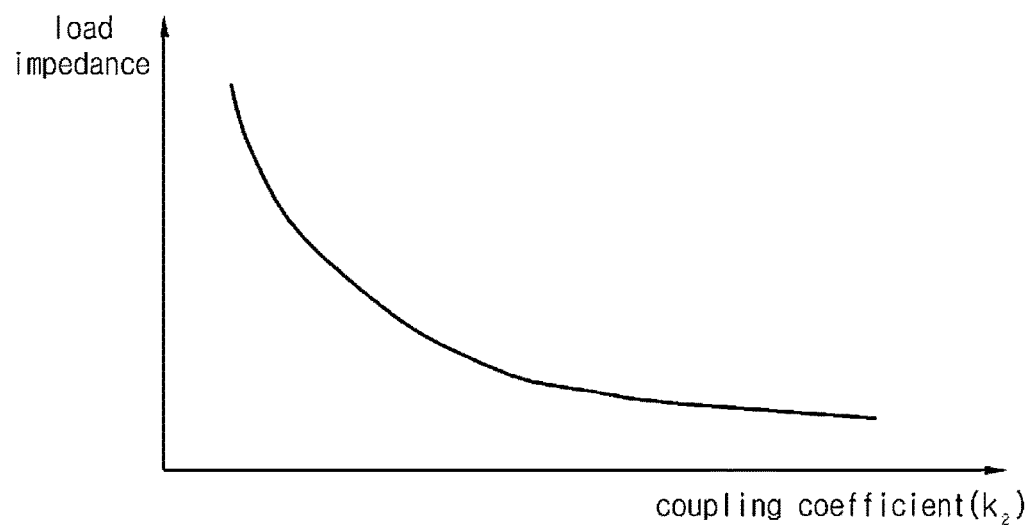
FIG. 4 is a graph showing the relation between a coupling coefficient and a load impedance in order to satisfy the maximum power transmission efficiency.
Figure 5:
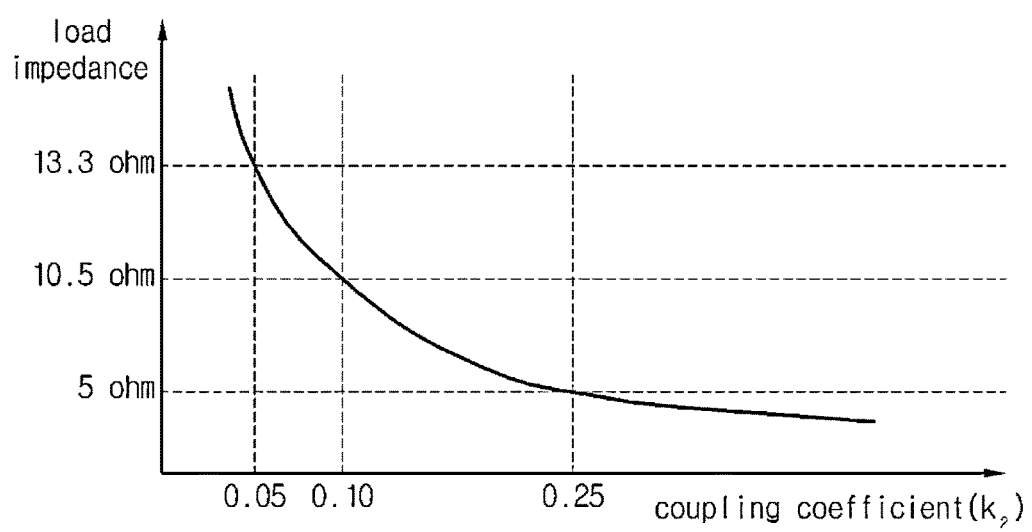
FIG. 5 is a graph showing an example of the relation between the coupling coefficient and the load impedance in order to satisfy the maximum power transmission efficiency when a load is a battery.
Figure 6:
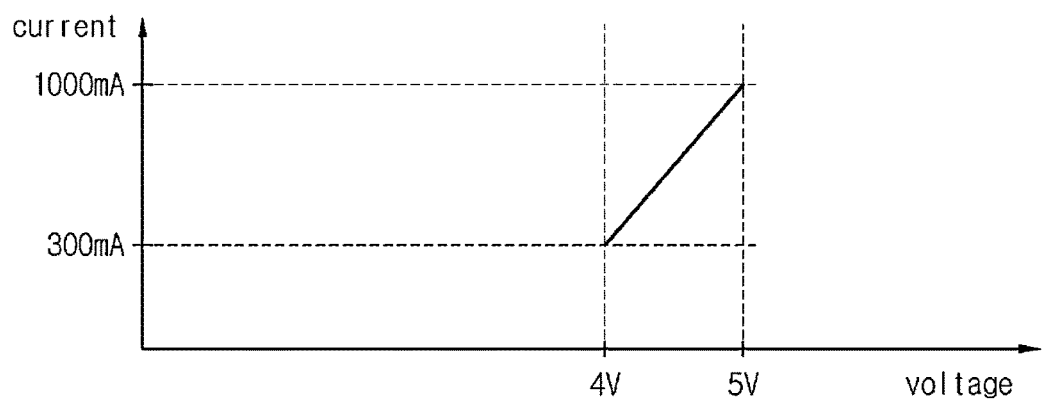
FIG. 6 is a graph showing relation between current and voltage applied to a battery when a load is the battery.
Figure 7:
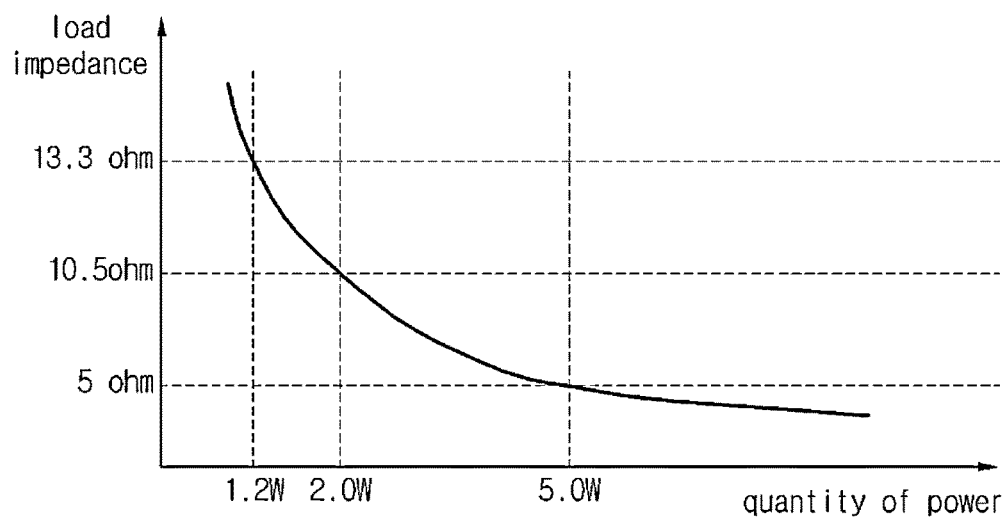
FIG. 7 is a graph showing the relation between the quantity of power applied to a battery and load impedance when the load is the battery.
Figure 8:
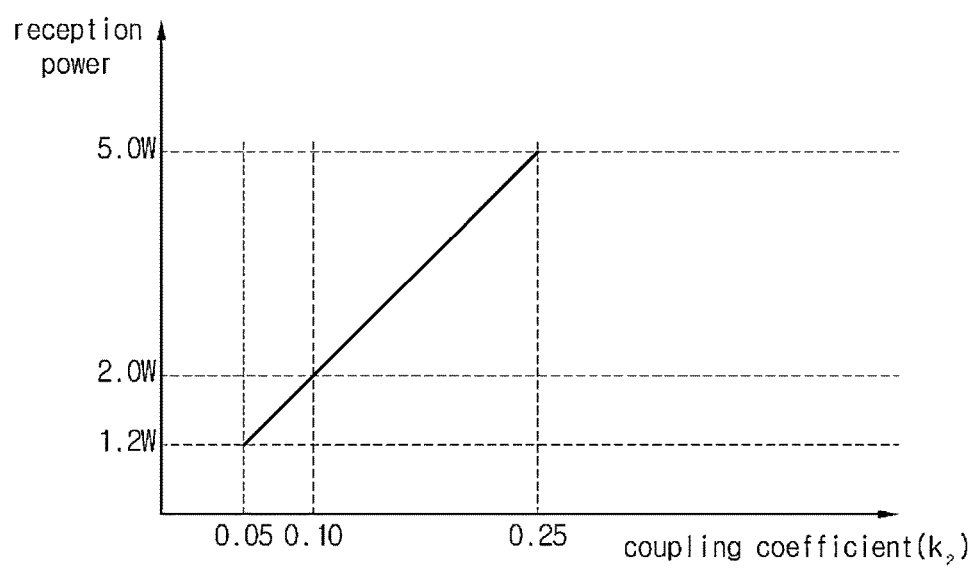
FIG. 8 is a graph showing the relation between the coupling coefficient and the load in order to satisfy the maximum power transmission efficiency when the load is the battery.

FIG. 3 is a flowchart to explain the method of controlling power according to one embodiment. FIG. 4 is a graph showing the relation between a coupling coefficient and a load impedance in order to satisfy the maximum power transmission efficiency. FIG. 5 is a graph showing an example of the relation between the coupling coefficient and the load impedance in order to satisfy the maximum power transmission efficiency when a load is a battery. FIG. 6 is a graph showing relation between current and voltage applied to a battery when a load is the battery. FIG. 7 is a graph showing the relation between the quantity of power applied to a battery and load impedance when the load is the battery. FIG. 8 is a graph showing the relation between the coupling coefficient and the load in order to satisfy the maximum power transmission efficiency when the load is the battery.

Hereinafter, the method of controlling the power will be described with reference to FIG. 3 as well as FIGS. 1 and 2.

The wireless power transmitter 200 measures an input impedance (step S101). The input impedance may be a first input impedance $Z_1$. The first input impedance $Z_1$ may be impedance when viewed from the power supply device 100 to the wireless power transmitter 200 as shown in FIG. 2. According to one embodiment, the detection unit 220 may measure the first input impedance $Z_1$ by using current and voltage input to the wireless power transmitter 200 from the power supply device 100.

Referring to FIG. 3 again, the detection unit 220 detects the coupling state between the wireless power transmitter 200 and the wireless power receiver 300 by using the input impedance (step S103). According to one embodiment, the coupling state between the wireless power transmitter 200 and the wireless power receiver 300 may be detected by measuring a coupling coefficient $K_2$ between the transmission resonant coil $L_2$ and the reception resonant coil $L_3$. In this case, the coupling coefficient $K_2$ represents the electromagnetic coupling degree between the transmission resonant coil $L_2$ and the reception resonant coil $L_3$. The coupling coefficient $K_2$ may be varied depending on at least one of the distance between the wireless power transmitter 200 and the wireless power receiver 300, and the directions and the positions of the wireless power transmitter 200 and the wireless power receiver.

The detected coupling state may be used to control the power to be transmitted to the wireless power receiver 300 by the wireless power transmitter 200. According to one embodiment, the wireless power transmitter 200 may increase the quantity of the power to be transmitted to the wireless power receiver 300 as the magnetic coupling between the wireless power transmitter 200 and the wireless power receiver 300 is weakened, and may decrease the quantity of the power to be transmitted to the wireless power receiver 300 as the magnetic coupling between the wireless power receiver 200 and the wireless power receiver 300 is strengthened.

Hereinafter, the method of detecting the coupling state, particularly, the coupling coefficient will be described.

Referring to FIG. 2, a third input impedance $Z_3$ may refer to an impedance when viewed from the reception resonant coil unit 311 to the reception induction coil unit 312, and may be expressed as Equation 1.

$$Z_3 = \frac{\omega^2 M_3^2}{Z_L + j\omega L_4 + \frac{1}{j\omega C_4}} \quad \text{Equation 1}$$

In Equation 1, $\omega$ represents the resonance frequency when the transmission resonant coil $L_2$ and a reception resonant coil $L_3$ make resonance, and $M_3$ refers to the mutual inductance between the reception resonant coil $L_3$ and the reception induction coil $L_4$. In addition, $Z_L$ refers to an output impedance. The output impedance $Z_L$ may be equal to the impedance $R_L$ of the load 400.

The mutual inductance $M_3$ may be calculated through Equation 2.

$$M_3 = K_3\sqrt{L_3 L_4} \qquad \text{Equation 2}$$

In Equation 2, $K_3$ represents the coupling coefficient between the reception resonant coil $L_3$ and the reception induction coil $L_4$ and is a fixed value. Since the inductance of the reception resonant coil $L_3$ and the inductance of the reception induction coil $L_4$ are fixed values, the mutual inductance $M_3$ is a fixed value.

Since the resonance frequency ω, the mutual inductance $M_3$, the load impedance $Z_L$, the inductance of the reception induction coil $L_4$, and the capacitance of the capacitor $C_4$ are fixed values, the third input impedance $Z_3$ has a fixed value.

Equation 1 is expressed based on a frequency domain, and following equations are expressed based on frequency domains.

The second input impedance $Z_2$ refers to an impedance when viewed from the wireless power transmitter 200 to the wireless power receiver 300, and may be expressed as Equation 3.

$$Z_2 = \frac{j\omega^3 C_3 M_2^2}{1 - \omega^2 L_3 C_3 + j\omega C_3(Z_3 + R_3)} \qquad \text{Equation 3}$$

In Equation 3, $M_2$ refers to the mutual inductance between the transmission resonant coil $L_2$ and the reception resonant coil $L_3$, and $C_3$ refers to a capacitor expressed when the reception resonant coil unit 311 is converted into an equivalent circuit. In addition, R3 represents the quantity of power loss occurring in the reception resonant coil L3 as a resistance.

The capacitance of the capacitor $C_3$, the inductance of the reception resonant coil L3, the third input impedance $Z_3$, and the resistor $R_3$ are fixed values.

The mutual inductance $M_2$ may be calculated through Equation 4.

$$M_2 = K_2\sqrt{L_2 L_3} \qquad \text{Equation 4}$$

In Equation 4, since the inductance of the transmission resonant coil $L_2$ and the inductance of the reception resonant coil $L_3$ are fixed values, the mutual inductance $M_2$ may be varied depending on the coupling coefficient $K_2$ between the transmission resonant coil $L_2$ and the reception resonant coil $L_3$.

Accordingly, if the third input impedance $Z_3$ in Equation 1 is substituted into Equation 3, the second input impedance $Z_2$ may be expressed in relation to the mutual inductance $M_2$, and may be varied depending on the mutual inductance $M_2$.

The first input impedance $Z_1$ refers to an impedance when viewed from the power supply device 100 to the wireless power transmitter 200, and may be expressed as Equation 5.

$$Z_1 = j\omega L_1 + \frac{1}{j\omega C_1} + \frac{j\omega^3 C_2 M_1^2}{1 - \omega^2 L_2 C_2 + j\omega C_2(Z_2 + R_2)} \qquad \text{Equation 5}$$

In Equation 5, $M_1$ refers to the mutual inductance between the transmission induction coil $L_1$ and the transmission resonant coil $L_2$.

The mutual inductance $M_1$ may be calculated through Equation 6.

$$M_1 = K_1\sqrt{L_1 L_2} \qquad \text{Equation 6}$$

In Equation 6, since the inductance of the transmission resonant coil $L_1$, the inductance of the transmission induction coil $L_2$, and the coupling coefficient $K_1$ between the transmission resonant coil $L_1$ and the transmission induction coil $L_2$ are fixed values, the mutual inductance $M_1$ has a fixed value.

Although the inductance of the transmission induction coil $L_1$, the capacitance of the capacitor $C_1$, the mutual inductance $M_1$, the inductance of the transmission resonant coil $L_2$, the capacitor $C_2$, and the resistor $R_2$ have fixed values, the second input impedance $Z_2$ may be varied depending on the mutual inductance $M_2$.

If Equation 2 is substituted into Equation 3, the first input impedance $Z_1$ may be expressed in relation to the mutual inductance $M_2$.

The detection unit 220 may calculate the mutual inductance $M_2$ by using the first input impedance $Z_1$ in the equation for the first input impedance $Z_1$ measured in step S101 and the mutual inductance $M_2$, and may detect the coupling coefficient $K_2$ through the calculated mutual inductance $M_2$ and Equation 4.

Another scheme of detecting the coupling coefficient $K_2$ will be described with reference to FIG. 13.

Referring to FIG. 3 again, the wireless power transmitter 200 decides reception power corresponding to the detected coupling state (step S105). In this case, the determined reception power may refer to power that the load 400 must receive in order to maximize the power transmission efficiency between the wireless power transmitter 200 and the load 400.

Hereinafter, a scheme of detecting the coupling coefficient $K_2$ and deciding the reception power that the load 400 must receive depending on the coupling coefficient $K_2$ will be described.

Referring to FIG. 2, the power transmission efficiency may be calculated through following Equation 7.

$$\text{Efficiency} = \frac{P_{out}}{P_{in}} = \frac{I_L^2 R_L}{I_1^2 Z_1} \qquad \text{Equation 7}$$

In Equation 7, $P_{in}$ may refer to transmission power transmitted to the wireless power transmitter 200 by the power supply device 100, and $P_{out}$ may refer to power consumed in the load 400 and reception power received in the load 400. $I_1$ is current flowing through the load 400.

The current $I_1$ is current input to the wireless power transmitter 200 while serving as current flowing through the transmission induction coil unit 211.

The current $I_1$ may be calculated through the following procedure.

When current flowing through the reception resonant coil unit 311 is represented as $I_3$, the current $I_3$ may be expressed as following Equation 8.

$$I_3 = \frac{R_L}{j\omega M_3} I_L \qquad \text{Equation 3}$$

When current flowing through the transmission resonant coil unit 212 is represented as $I_2$, the current $I_2$ may be expressed as following Equation 9.

$$I_2 = \frac{I_3}{\omega^2 M_2 C_3}(1 - \omega^2 L_3 + j\omega C_3(R_3 + Z_3))\quad\text{Equation 9}$$

When current flowing through the transmission induction coil unit 211 is represented as $I_1$, the current $I_1$ may be expressed as following Equation 10.

$$I_1 = \frac{I_2}{\omega^2 M_1 C_2}(1 - \omega^2 L_2 + j\omega C_2(R_2 + Z_2))\quad\text{Equation 10}$$

Equation 8 is substituted into Equation 9, and the substitution result of Equation 9 is substituted into Equation 10. Next, the substitution result of Equation 10 and the first input impedance $Z_1$ represented as the mutual inductance $M_2$ are substituted in Equation 7. In this case, Equation 11 is obtained in relation to the power transmission efficiency.

$$\text{Efficiency} = \left(\frac{j\omega M_3\, j\omega M_2\, j\omega M_1}{R_2 R_3 R_L + \omega^2 M_3^2 R_2 + \omega^2 M_2^2 R_L}\right)^2\quad\text{Equation 11}$$

$$\left(\frac{R_2 R_3 R_L + \omega^2 M_3^2 R_2 + \omega^2 M_2^2 R_L}{\omega^2 M_1^2 (R_3 R_L + \omega^2 M_3^2)}\right) R_L$$

Equation 11 is arranged as Equation 12.

$$\text{Equation 12}$$

$$\text{Efficiency} = \frac{(j\omega M_3\, j\omega M_2\, j\omega M_1)^2}{(R_2 R_3 R_L + \omega^2 M_3^2 R_2 + \omega^2 M_2^2 R_L)\omega^2 M_1^2 (R_3 R_L + \omega^2 M_3^2)} R_L$$

$$= \frac{\omega^4 M_3^2 M_2^2}{(R_2 R_3 R_L + \omega^2 M_3^2 R_2 + \omega^2 M_2^2 R_L)(R_3 R_L + \omega^2 M_3^2)} R_L$$

The quality factor $Q_2$ of the transmission resonant coil unit 212 is expressed as following Equation 13, and the quality factor $Q_3$ of the reception resonant coil unit 311 is expressed as Equation 14.

$$Q_2 = \frac{\omega L_2}{R_2}\quad\text{Equation 13}$$

$$= \frac{1}{R_2}\sqrt{\frac{L_2}{C_2}}$$

$$Q_3 = \frac{\omega L_3}{R_3}\quad\text{Equation 14}$$

$$= \frac{1}{R_3}\sqrt{\frac{L_3}{C_3}}$$

When Equation 13 and Equation 14 are substituted into Equation 12, the substitution result is arranged as following Equation 15.

$$\text{Efficiency} = \frac{\omega^4 L_3 L_4 L_3 L_2 k_2^2}{\left(\frac{\omega L_2}{Q_2}\frac{\omega L_3}{Q_3} R_L + \omega^2 L_3 L_4 \frac{\omega L_2}{Q_2} + \omega^2 k_2^2 L_3 L_2 R_L\right)} R_L\quad\text{Equation 15}$$

$$\left(\frac{\omega L_3}{Q_3} R_L + \omega^2 L_3 L_4\right)$$

-continued $$= \frac{\omega L_4 k_2^2}{\left(\frac{1}{Q_2}\frac{1}{Q_3} + L_4 \frac{\omega}{R_L Q_2} + k_2^2\right)\left(\frac{1}{Q_3} R_L + \omega L_4\right)}$$

$$= \frac{k_2^2 Q_2 Q_3}{\left(1 + \frac{\omega Q_3 L_4}{R_L} + Q_2 Q_3 k_2^2\right)\left(\frac{R_L}{Q_3 \omega L_4} + 1\right)}$$

For the calculation convenience, x is substituted as Equation 16, and m is substituted as Equation 17.

$$x = \frac{\omega Q_3 L_4}{R_L}\quad\text{Equation 16}$$

$$m = k_2^2 Q_2 Q_3\quad\text{Equation 17}$$

If Equation 16 and Equation 17 are substituted into Equation 15 which is an equation for power transmission efficiency, the power transmission efficiency may be arranged as Equation 18.

$$\text{Efficiency} = \frac{m}{(1 + x + m)\left(\frac{1}{x} + 1\right)}\quad\text{Equation 18}$$

$$= \frac{mx}{(x + m + 1)(x + 1)}$$

$$= \frac{mx}{x^2 + (m + 2)x + m + 1}$$

If Equation 18 is differentiated with respect to x in order to obtain a condition of maximizing the power transmission efficiency, following Equation 19 may be obtained.

$$\frac{d\text{Efficiency}}{dx} = \frac{m(x^2 + (m+2)x + m + 1) - mx(2x + m + 2)}{(x^2 + (m+2)x + m + 1)^2}\quad\text{Equation 19}$$

$$= \frac{-mx^2 + m^2 + m}{(x^2 + (m+2)x + m + 1)^2}$$

The condition of maximizing the power transmission efficiency in Equation 19 is satisfied when x is expressed as following Equation 20.

$$x = \sqrt{m+1}\quad\text{Equation 20}$$

If x in Equation 16 and m in Equation 17 are substituted into Equation 20, following Equation 21 is obtained.

$$\frac{\omega Q_3 L_4}{R_L} = \sqrt{k_2^2 Q_2 Q_3 + 1}\quad\text{Equation 21}$$

When Equation 21 is arranged with respect to $R_L$, following Equation 22 is obtained.

$$R_L = \frac{\omega L_4 Q_3}{\sqrt{k_2^2 Q_2 Q_3 + 1}}\quad\text{Equation 22}$$

In other words, when the impedance $R_L$ of the load 400 has the value the same as that of Equation 22, the power transmission efficiency is maximized. In this case, the power transmission efficiency may be calculated as shown in FIG. 23.

$$\text{Efficiency} = \frac{mx}{x^2 + (m+2)x + m + 1} \quad \text{Equation 23}$$

$$= \frac{m\sqrt{m+1}}{m+1 + (m+2)\sqrt{m+1} + m + 1}$$

$$= \frac{m}{2\sqrt{m+1} + (m+2)}$$

$$= \frac{m}{2\sqrt{m+1} + \left(\sqrt{m+1}\right)^2 + 1}$$

$$= \frac{m}{\left(\sqrt{m+1} + 1\right)^2}$$

$$= \frac{k_2^2 Q_2 Q_3}{\left(\sqrt{k_2^2 Q_2 Q_3 + 1} + 1\right)^2}$$

In other words, when the impedance $R_L$ of the load 400 is the same as that expressed as Equation 22, the maximum power transmission efficiency may be obtained as Equation 23.

Referring to Equation 22, the impedance $R_L$ of the load 400 to satisfy the condition of maximizing the power transmission efficiency may be varied depending on the coupling coefficient $K_2$.

In detail, the relation between the coupling coefficient $K_2$ and the impedance of the load 400 is shown as a graph in FIG. 4.

In FIG. 4, an x axis represents the coupling coefficient $K_2$ and a y axis represents a load impedance.

Referring to FIG. 4, as the coupling coefficient $K_2$ is increased, the load impedance is decreased. As the coupling coefficient $K_2$ is decreased, the load impedance is increased. In other words, the power transmission efficiency can be maximized when the load impedance is varied depending on the coupling coefficient $K_2$. In detail, the power transmission efficiency can be maximized when the load impedance is increased as the coupling coefficient is increased and the load impedance is increased as the coupling coefficient is decreased.

The coupling coefficient $K_2$ may be varied depending on one of the distance between the wireless power transmitter 200 and the wireless power receiver 300 and positions of the wireless power transmitter 200 and the wireless power receiver 300 located in relation to each other. Accordingly, in order to obtain the maximum power transmission efficiency, the impedance of the load 400 may be varied.

FIG. 5 is a graph showing the relation between the coupling coefficient K and the load impedance in detailed numeric values.

The load impedance 13.3Ω when the coupling coefficient $K_2$ is 0.05, the load impedance 8Ω when the coupling coefficient $K_2$ is 0.10, and the load impedance is 5Ω when the coupling coefficient $K_2$ is 0.25. Accordingly, the power transmission efficiency is maximized if the load impedance is reduced as the coupling coefficient $K_2$ is increased.

In general, the load 400 may include the battery of the cellular phone. The impedance of the battery may be varied depending on the quantity of power applied to the battery. In this case, for example, the load 400 may include the battery of the cellular phone, but the embodiment is not limited thereto. The load 400 may include various types of batteries if the impedance of the load 400 is varied depending on the quantity of power applied to the load 400.

FIG. 6 is a graph showing current as a function of voltage applied to the battery.

The impedance $R_L$ of the battery may be expressed as following Equation 24.

$$R_L = \frac{V}{I} \quad \text{Equation 24}$$

In Equation 24, V represents voltage applied to the battery, and I represents current flowing through the battery.

If the voltage of 4 V is applied to the battery, the quantity of power applied to the battery is 1.2 W (4V×0.3 A). In this case, the impedance of the battery becomes 13.3Ω (4V/0.3 A).

If the voltage of 4.583 V is applied to the battery, the quantity of power applied to the battery becomes 2.0 W (4.583V×0.437 A). In this case, the impedance of the battery becomes about 10.5Ω (4.458 V/0.437 A).

If the voltage of 5V is applied to the battery, the quantity of power applied to the battery becomes 5.0 W (5V×1.0 A), and the impedance of the battery becomes 5.0Ω (5V/1 A).

In other words, as described above, the impedance of the battery may be varied depending on the quantity of power applied to the battery.

In addition, when the relation between the load impedance and the quantity of power applied to the battery to satisfy the maximum power transmission efficiency is represented as a graph based on the above result, the graph is expressed as shown in FIG. 7.

In FIG. 7, an x axis represents the quantity of power applied to the battery, and a y axis represents the impedance of the battery (load).

As shown in FIG. 7, the impedance of the battery may be varied depending on the quantity of power applied to the battery.

In this case, when comparing FIG. 5 with FIG. 7, the graphs shown in FIGS. 5 and 7 are similar to each other. In detail, referring to FIG. 5, the impedance of the load is decreased as the coupling coefficient $K_2$ is increased, and the impedance of the load is increased as the coupling coefficient $K_2$ is decreased. Referring to FIG. 7, the impedance of the battery is decreased as the quantity of power applied to the battery is increased, and the impedance of the battery is increased as the quantity of power applied to the battery is decreased. The waveforms of the graphs shown in FIGS. 5 and 7 are very similar to each other.

In other words, if the wireless power transmission system 10 employs the load 400 such as a battery having impedance varying depending on the quantity of power applied to the load 400, a specific corresponding relation is established between the coupling coefficient $K_2$ and the reception power of the load 400. In this case, if the transmission power is adjusted to establish the specific corresponding relation between the coupling coefficient $K_2$ and the reception power of the load 400, the condition to obtain the maximum power transmission efficiency shown in FIG. 5 can be satisfied.

In other words, the load impedance must be adjusted in order to obtain the maximum transmission efficiency depending on the coupling coefficient $K_2$. The adjustment of the load impedance is possible by controlling the quantity of power as shown in FIG. 7. In other words, if the reception power of the battery may be decided depending on the coupling coefficient $K_2$, and the transmission power is adjusted such that the battery receives the decided reception power, the condition of maximizing the power transmission efficiency of FIG. 5 is satisfied, so that the maximum power transmission efficiency can be obtained.

The corresponding relation may be represented as shown in the graph of FIG. 8.

Referring to FIG. 8, the reception power received in the battery as a function of the coupling coefficient K is shown as a graph. If the quantity of power received in the battery is 1.2 W when the coupling coefficient is 0.05, the quantity of power received in the battery is 2.0 W when the coupling coefficient $K_2$ is 0.10, and the quantity of power received in the battery is 5 W when the coupling coefficient $K_2$ is 0.25, the condition to obtain the maximum power transmission efficiency shown in FIG. 5 is satisfied.

Finally, in order to obtain the maximum power transmission efficiency, the reception power that must be sent to the load 400 must be decided depending on the coupling coefficient $K_2$.

According to one embodiment, the wireless power transmitter 200 may further include a storage unit (not shown) to store the reception power corresponding to the coupling coefficient $K_2$. The wireless power transmitter 200 searches the storage unit for the reception power corresponding to the coupling coefficient $K_2$ and decide the reception power.

Referring to FIG. 3, the wireless power transmitter 200 determines present reception power received by the load 400 (step S107). Since the wireless power receiver 300 may send the power received from the wireless power transmitter 200 to the load 400 without power loss, the power received by the wireless power receiver 300 is assumed as being equal to the power received by the load 400.

The wireless power transmitter 200 may determine the present reception power received by the load 400 through various schemes.

According to one embodiment, the wireless power transmitter 200 may determine the present reception power received by the load 400 through the out-of-band communication described in FIG. 2. In detail, the wireless power transmitter 200 requests the information of the present reception information received by the wireless power receiver 300 through the out-of-band communication and receives the response to the request, thereby determining the present reception power.

According to one embodiment, the wireless power transmitter 200 may determine the present reception power received in the load 400 by measuring the intensity of current flowing in the wireless power transmitter 200. In this case, the wireless power transmitter 200 may include the power supply device 100 described in FIG. 1. For example, the intensity of current flowing inside the wireless power transmitter 200 may be related to the present reception power received by the load 400. In detail, when the distance between the wireless power transmitter 200 and the wireless power receiver 300 is constant, the intensity of current flowing in the wireless power transmitter 200 may be increased as the quantity of power received by the load 400 is increased, and the intensity of current flowing inside the wireless power transmitter 200 may be decreased as the quantity of the power received by the load 400 is decreased.

The wireless power transmitter 200 may include a storage unit 170 to store the intensity of current flowing inside the wireless power transmitter 200 and the power received by the load 400 corresponding to each other. The wireless power transmitter 200 may find the reception power corresponding to the intensity of current by searching for the storage unit 170 and determine the present reception power received by the load 400.

Thereafter, the wireless power transmitter 200 determines if the determined reception power is equal to the decided reception power (step S109).

If it is determined that the determined reception power is different from the decided reception power, the wireless power transmitter 200 decides transmission power to be transmitted to the wireless power receiver 300 (step S111) In other words, the wireless power transmitter 200 may decide transmission power corresponding to the decided reception power in order to obtain the maximum power transmission efficiency.

The wireless power transmitter 200 controls transmission power to be transmitted to the wireless power receiver 300 in order to transmit the decided transmission power to the wireless power receiver 300 (step S113). According to one embodiment, the wireless power transmitter 200 may control the transmission power by controlling the power supply unit 110 to supply the power to the power supply device 100, and the details thereof will be described in detail with reference to FIGS. 9 and 10.

According to still another embodiment, the wireless power transmitter 200 may control the transmission power by measuring the current flowing inside the wireless power transmitter 200, and the details thereof will be described with reference to FIGS. 11 and 12.

The wireless power transmitter 200 may receive the decided transmission power from the power supply device 100 and transmit the transmission power to the wireless power receiver 300. Accordingly, the load 400 may receive the reception power to satisfy the maximum power transmission efficiency from the wireless power receiver 300.

As described above, according to the embodiment, the wireless power transmitter 200 transmits the transmission power to maximize the power transmission efficiency, and the load 400 may receive the reception power to make the power transmission efficiency maximized, so that the power transmission efficiency can be maximized.

Hereinafter, a method of controlling power according to another embodiment will be described with reference to FIGS. 9 and 10 by incorporating the description made with reference to FIGS. 1 to 8. In particular, FIGS. 9 and 10 show a scheme of controlling the transmission power in step S113 of FIG. 3.

Figure 9:
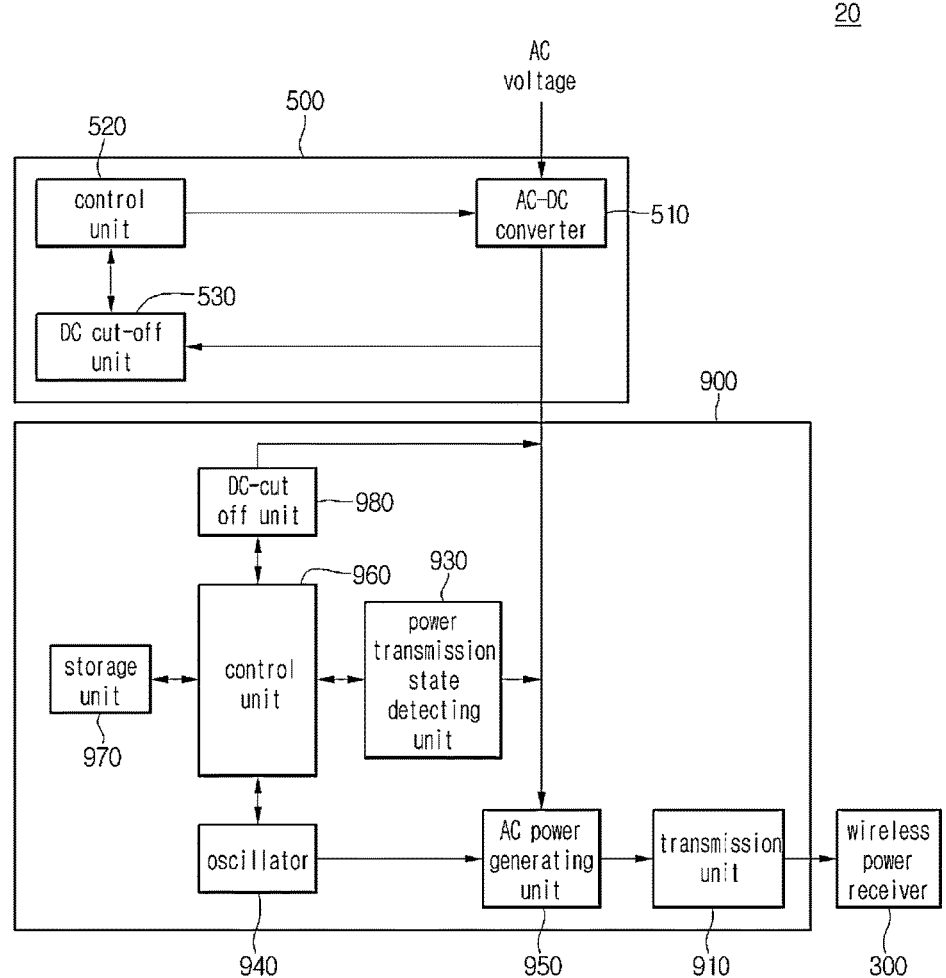
FIG. 9 is a block diagram showing the structure of a wireless power transmission system according to another embodiment.
Figure 10:
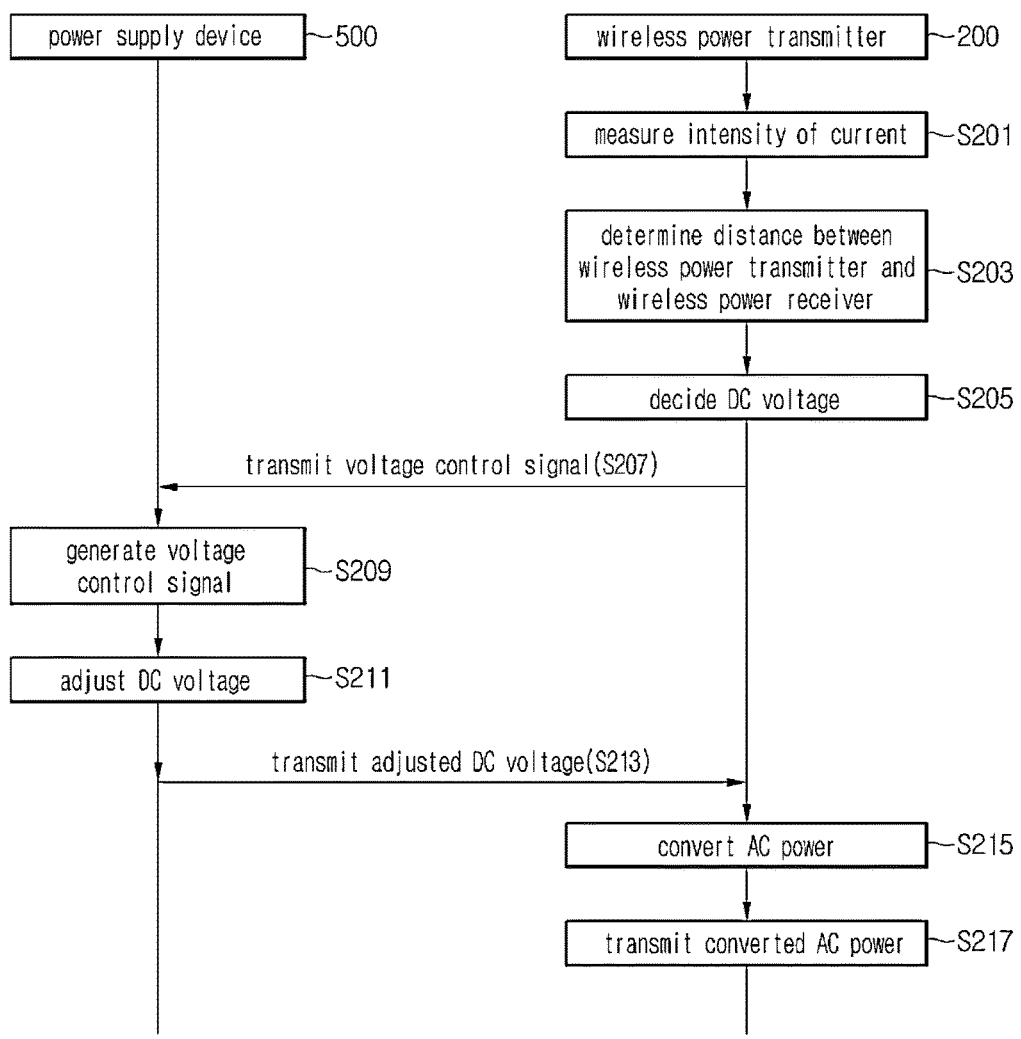
FIG. 10 is a ladder diagram to explain a method of controlling power according to another embodiment.

FIG. 9 is a block diagram showing the structure of a wireless power transmission system according to another embodiment. FIG. 10 is a ladder diagram to explain a method of controlling power according to another embodiment.

The wireless power transmission system 20 may include a power supply device 500, a wireless power transmitter 900, and the wireless power receiver 300.

The wireless power receiver 300 has the same components and structure as those described with reference to FIGS. 1 to 2.

The wireless power transmitter 900 may receive DC power from the power supply device 500. In detail, the wireless power transmitter 900 transmits a voltage control signal to the power supply device 500 to receive adjusted DC voltage.

The wireless power transmitter 900 may further include a transmission unit 910, a power transmission state detecting unit 930, an oscillator 940, an AC power generating unit 950, a control unit 960, a storage unit 970, and a DC cut-off unit 980.

The power transmission state detecting unit 930 may detect the power transmission state between the wireless power transmitter 900 and the wireless power receiver 300. According to one embodiment, the power transmission state detecting unit 930 may detect the power transmission state based on the current flowing inside the power supply device 100. To this end, the power transmission state detecting unit 930 may use a current sensor. The current sensor may detect the current flowing through a circuit and measure the intensity of the detected current when the DC voltage received from the power supply device 500 is applied to the AC power generating unit 950. However, a measurement point of the power transmission state detecting unit 930 is not limited thereto, but may include an output point of the AC power generating unit 950 to be described later.

The intensity of current flowing inside the wireless power transmitter 900 may be varied depending on the power transmission state between the wireless power transmitter 900 and the wireless power receiver 300. Details of the power transmission state will be described later.

According to one embodiment, the power transmission state detecting unit 930 may include a current transformer (CT).

The oscillator 940 may generate an AC signal having a predetermined frequency. When the transmission unit 910 to be described later transmits power to the wireless power receiver 300 through resonance, the oscillator 940 may generate an AC signal having a resonance frequency to allow the transmission resonant coil included in the transmission unit 910 to operate at the resonance frequency and transmit the AC signal to the AC power generating unit 950. The AC signal generated from the oscillator 940 is applied to the AC power generating unit 950.

The AC power generating unit 950 may generate AC power by using DC power received from an AC-DC converter 510 of the power supply device 500 based on the AC signal received from the oscillator 940.

The AC power generating unit 950 may amplify the AC signal received from the oscillator 940. According to one embodiment, the amplification degree of the AC signal may be varied depending on the intensity of the DC voltage applied to the AC power generating unit 950.

According to one embodiment, the AC power generating unit 950 may include a push-pull type dual MOSFET.

The control unit 960 may control the overall operation of the wireless power transmitter 900.

The control unit 960 may detect the power transmission state variation between the wireless power transmitter 900 and the wireless power receiver 300. The control unit 960 may detect the power transmission state variation to decide the DC power to be received from the power supply device 500, and may transmit a power control signal to the power supply device 500 in order to receive the decided DC power through a PLC scheme. According to one embodiment, the power transmission state may relate to the distance between the wireless power transmitter 900 and the wireless power receiver 300 and the directions in which the wireless power transmitter 900 and the wireless power receiver 300 are located.

According to one embodiment, the power transmission state may relate to a power reception state of the wireless power receiver 300. For example, if power charged in the wireless power receiver 300 is less than a reference quantity of power, the wireless power receiver 300 may request the wireless power transmitter 900 to transmit power greater than present power, which is being transmitted, through out-of-band communication. However, the wireless power transmitter 900 may decide transmission power to be transmitted to the wireless power receiver 300 corresponding to the request. The wireless power transmitter 900 may determine the DC power to be received from the power supply device 500 corresponding to the decided transmission power, and may control the power supply device 500 in order to receive the determined DC power. Thereafter, the wireless power transmitter 900 may receive the decided DC power from the power supply device 500 and convert the DC power into AC power to be transmitted to the wireless power receiver 300.

The control unit 960 may detect the coupling state between the wireless power transmitter 900 and the wireless power receiver 300 by receiving the information of the power transmission state through the power transmission state detecting unit 930. According to one embodiment, if the power transmission state detecting unit 930 is a current sensor, the control unit 960 may receive the intensity of current by the current sensor and detect the distance between the wireless power transmitter 900 and the wireless power receiver based on the intensity of the current.

The control unit 960 may decide the DC voltage to be received from the power supply device by using the detected distance. The control unit 960 may transmit the voltage control signal including the information of the decided DC voltage to the power supply device 500. In this case, the voltage control signal may be transmitted between the wireless power transmitter 900 and the power supply device 500 through the PLC scheme. The PLC scheme is a technology of carrying data on a high frequency signal of several hundreds kHz to several tens MHz by employing a power line to supply power as a medium. In other words, the PLC scheme may be performed through a power line subject to a wiring work without separately installing a dedicated communication line.

According to one embodiment, the control unit 960 may determine the distance between the wireless power transmitter 900 and the wireless power receiver 300 based on the intensity of current.

According to one embodiment, the control unit 960 may decide DC voltage to be received from the power supply 500 based on the intensity of the current instead of the determined distance.

The storage unit 970 may store the intensity of current measured by the current sensor of the power transmission state detecting unit 930 and the distance between the wireless power transmitter 900 and the wireless power receiver 300 corresponding to each other in the form of a look-up table.

The storage unit 970 may store the intensity of current measured by the current sensor of the power transmission state detecting unit 930 and DC voltage to be received from the power supply device 500 by the wireless power transmitter 900 corresponding to each other in the form of a look-up table.

The storage unit 970 may store the intensity of current in the current sensor of the power transmission state detecting unit 930, the distance between the wireless power transmitter 900 and the wireless power receiver 300, and the DC voltage to be received from the power supply device 500 by the wireless power transmitter 900 corresponding to each other in the form of a look-up table.

The DC cut-off unit 980 may cut off a DC signal applied to the control unit 960. According to one embodiment, the DC-cut off unit 980 may include a capacitor.

The transmission unit 910 may wirelessly transmit AC power output from the AC power generating unit 950 to the wireless power receiver 300.

The power supply device 500 may include the AC-DC converter 510, the control unit 520, and the DC cut-off unit 530. According to one embodiment, the power supply device 500 may include an adaptor to convert AC power received from an external device into DC power.

The AC-DC converter 510 may convert AC voltage received from the external device into DC voltage having a predetermined size. In this case, the AC voltage received from the outside may have the intensity of 220V and the frequency of 60 Hz, but the embodiment is not limited thereto. The control unit 520 receives the voltage control signal from the wireless power transmitter 900 to control the AC-DC converter 510 to output the DC voltage decided by the wireless power transmitter 900. In other words, the control unit 520 may generate a voltage control signal to control the AC-DC converter 510 so that DC voltage is output corresponding to the intensity of current measured by the wireless power transmitter 900. In this case, the AC-DC converter 510 may convert the AC voltage received from an outside into DC voltage having a predetermined size by receiving a voltage control signal and output the DC voltage.

The DC cut-off unit 530 may cut off the DC signal applied to the control unit 520. According to one embodiment, the DC cut-off unit 530 may include a capacitor.

FIG. 10 is a ladder diagram to explain a method of controlling power according to another embodiment.

Hereinafter, the method of controlling the power according to another embodiment will be described by incorporating the description of FIG. 9.

Referring to FIG. 10, the current sensor of the power transmission state detecting unit 930 may measure the intensity of current flowing through inside the wireless power transmitter 900 (step S201). The current sensor of the power transmission state detecting unit 930 may measure the intensity of detected current by detecting the current flowing inside the wireless power transmitter 900.

According to one embodiment, the current sensor of the power transmission state detecting unit 930 may measure the intensity of current input into the AC power generating unit 950 shown in FIG. 9. In addition, according to another embodiment, although the current sensor of the power transmission state detecting unit 930 may measure the intensity of current output from the AC power generating unit 950, the embodiment is not limited thereto. In other words, the current sensor may measure the intensity of current flowing inside the wireless power transmitter 900.

According to one embodiment, the current sensor of the power transmission state detecting unit 930 may include a CT. The CT may measure higher-intensity current flowing through the circuit by lowering the higher-intensity current to lower-intensity current. In other words, the CT may measure current flowing through the circuit by transforming the current flowing through the circuit into current proportional to the current flowing through the circuit. In more detail, the CT may include a primary winding, a secondary winding, and an iron core. If the electromagnetic induction phenomenon occurs due to magnetic flux passing through the iron core, the primary current may be transformed into the secondary current in proportion to a CT ratio, and may measure the transformed secondary current.

According to one embodiment, the current sensor of the power transmission state detecting unit 930 may include one of a wound-type CT, a bar-type CT, a through-type CT, a tertiary winding CT, and a multi-core CT.

According to one embodiment, the intensity of current measured by the current sensor of the power transmission state detecting unit 930 may be varied depending on the distance between the wireless power transmitter 900 and the wireless power receiver 300. In other words, the increase in the intensity of the current measured by the current sensor of the power transmission state detecting unit 930 refers to that the wireless power transmitter 900 is closer to the wireless power receiver. The decrease in the intensity of the current measured by the current sensor of the power transmission state detecting unit 930 refers to that the wireless power transmitter 900 is gradually away from the wireless power receiver.

The distance between the wireless power transmitter 900 and the wireless power receiver 300 may refer to the distance between coils included in the device.

The control unit 960 may determine the distance between the wireless power transmitter 900 and the wireless power receiver 300 based on the intensity of the measured current (step S203). The wireless power transmitter 900 may determine the distance between the wireless power transmitter 900 and the wireless power receiver 300 based on the intensity of the current measured through the control unit 960. According to one embodiment, the storage unit 970 may store the intensity of the measured current and the distance corresponding to each other in the form of a look-up table, and the control unit 960 may determine the distance corresponding to the intensity of the measured current by searching for the storage unit 970.

The control unit 960 decides DC voltage to be received from the power supply device 500 based on the determined distance (step S205).

According to one embodiment, the control unit 960 may decide DC voltage to be received from the power supply device 500 based on the intensity of the measured current instead of the distance. In this case, the step S203 may be omitted. In other words, if the storage unit 970 stores the intensity of the measured current and the DC voltage to be received by the wireless power transmitter 900 corresponding to each other, the control unit 960 may decide DC voltage to be received by the wireless power transmitter 900 corresponding to the intensity of the measured current by searching for the storage unit 970.

According to still another embodiment, the storage unit 970 may store the intensity of current measured by the power transmission state detecting unit 930, the distance between the wireless power transmitter 900 and the wireless power receiver 300, and the DC voltage to be received from the power supply device 500.

The wireless power transmitter 900 transmits the voltage control signal based on the decided DC voltage to the power supply device 500 (step S207). According to one embodiment, the voltage control signal may be a signal to control the power supply device 500 so that the wireless power transmitter 900 may receive the decided DC voltage from the power supply device 500.

According to one embodiment, the wireless power transmitter 900 may make communication with the power supply device 500 through a PLC scheme. The wireless power transmitter 900 may transmit the voltage control signal to the power supply device 500 through the PLC scheme. The PLC scheme is a technology of carrying data on a high frequency signal of several hundreds kHz to several tens MHz by employing a power line to supply power as a medium. In other words, the PLC scheme may be performed through a power line subject to a wiring work without separately installing a dedicated communication line.

As described above, when the voltage control signal is transmitted through the PLC scheme according to the embodiment, an additional power line to transmit the voltage control signal is not required, so that the cost can be saved. In other words, according to the embodiment, since the voltage control signal is transceived by using the power line serving as a medium to transmit power between the power supply device 500 and the wireless power transmitter 900, an additional power line is not required.

In addition, according to the embodiment, since the DC voltage received from the power supply device 500 may be adjusted through the PLC scheme without the DC-DC converter to convert the DC voltage into predetermined voltage, the manufacturing cost of the wireless power transmitter 900 may be greatly saved.

During the procedure in which the wireless power transmitter 900 transmits the voltage control signal to the power supply device 500, the DC-cut off unit 980 may cut off a DC signal applied to the control unit 960. The wireless power transmitter 900 receives the DC voltage from the power supply device 500. If the DC voltage is applied to the control unit 960, since the control unit 960 may be damaged. Accordingly, the DC-cut off unit 980 cuts off the DC voltage to protect the control unit 960.

According to one embodiment, the DC-cut off unit 980 may include a capacitor. The impedance of the capacitor may be expressed as $Xc=1/2\pi fC$. If the DC signal is applied to the capacitor (frequency f=0), the impedance becomes infinite to cut off the DC signal.

Since the voltage control signal transmitted to the power supply device 500 by the wireless power transmitter 900 is an AC signal, the control unit 960 may transmit the voltage control signal to the power supply device 500 regardless of the DC-cut off unit 980.

The power supply device 500 receives the voltage control signal from the wireless power transmitter 900 and generates a voltage control signal to output DC voltage to be transmitted to the wireless power transmitter 900 according to the received voltage control signal (step S209). The power supply device 500 may generate the voltage control signal to output the DC voltage to be transmitted to the wireless power transmitter 900 through the control unit 520. The control unit 520 may transmit the voltage control signal to the AC-DC converter 510.

During the procedure in which the power supply device 500 receives the voltage control signal from the wireless power transmitter 900, the DC-cut off unit 530 of the power supply device 500 may cut off a DC signal applied to the control unit 960. The AC-DC converter 510 of the power supply device 500 transmits the DC voltage to the wireless power transmitter 900. If the DC voltage is applied to the control unit 520, the control unit 520 may be damaged. Accordingly, the DC cut-off unit 530 may cut of the DC voltage to protect the control unit 520.

According to one embodiment, the DC-cut off unit 530 may include a capacitor. The impedance of the capacitor may be expressed as $Xc=1/2\pi fC$. If the DC signal is applied to the capacitor (frequency f=0), the impedance becomes infinite to cut off the DC signal.

The power supply device 500 adjusts the DC voltage by receiving the voltage control signal from the control unit 520 (step S211). The power supply device 500 may adjust the DC voltage to be transmitted to the wireless power transmitter 200 by receiving the voltage control signal through the AC-DC converter 510. The AC-DC converter 510 may convert the AC voltage, which is applied from an outside, into predetermined DC voltage based on the voltage control signal and output the AC voltage.

The power supply device 500 transmits the adjusted DC voltage to the wireless power transmitter 200 (step S213). The power supply device 500 may transmit the DC voltage adjusted through the AC-DC converter 510 to the wireless power transmitter 900.

The AC power generating unit 950 converts the received DC power into DC power based on an AC signal having a predetermined frequency received from the oscillator 940 (step S215).

The AC power generating unit 950 transmits the output AC power to the transmission unit 910 (step S217).

The AC power received in the transmission unit 910 may be transmitted to the wireless power receiver 300 by resonance.

Since the power supplied from the power supply device may be controlled depending on power transmission environments between the wireless power transmitter and the wireless power receiver according to the embodiment as described above, an additional DC-DC converter is not required. Accordingly, the manufacturing cost of the wireless power transmitter can be significantly saved.

Hereinafter, a method of controlling power according to another embodiment will be described with reference to FIGS. 11 and 12 by incorporating the description made with reference to FIGS. 1 to 8. In particular, FIGS. 11 and 12 show a scheme of controlling the transmission power in step S113 of FIG. 3.

Figure 11:
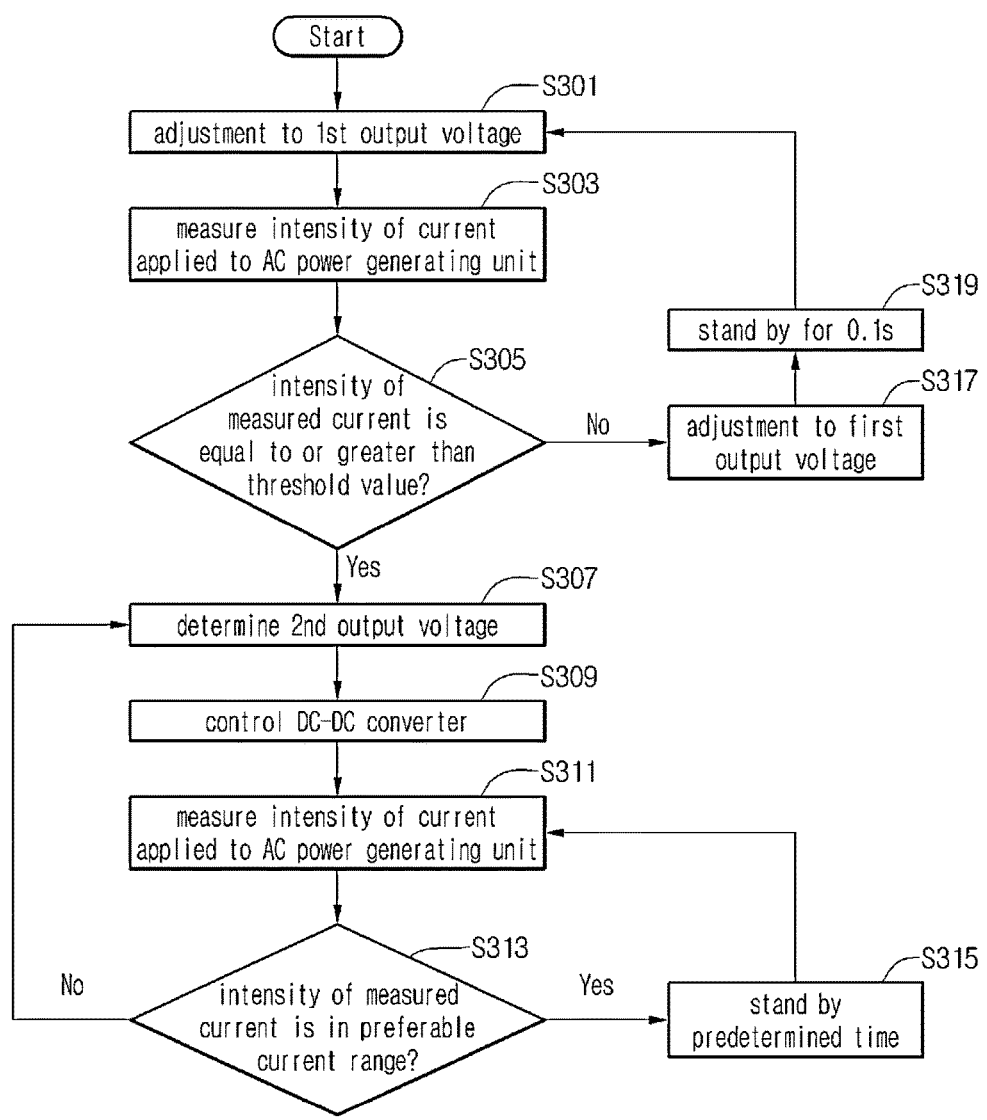
FIG. 11 is a flowchart to explain a method of controlling power according to another embodiment.

FIG. 11 is a flowchart to explain a method of controlling power according to another embodiment. FIG. 12 is a view to explain a look-up table in which a current value when a first output voltage is applied to an AC power generating unit, a coupling coefficient, a second output voltage, and a preferable current range correspond to each other.

The description of the wireless power transmitter 200 is the same as that of FIG. 1. In this case, the wireless power transmitter 200 may include all components of the power supply device 100.

First, the control unit 180 controls the DC-DC converter 130 so that the voltage applied to the AC power generating unit 160 is adjusted to a first output voltage (step S301). In this case, the first output voltage may refer to preset DC voltage.

Thereafter, the current sensor of the power transmission state detecting unit 140 may measure the intensity of current applied to the AC power generating unit 160 when the DC voltage output from the DC-DC converter 130 is applied to the AC power generating unit 160 (step S303). The intensity of the current applied to the AC power generating unit 160 may be varied depending on the power transmission state between the wireless power transmitter 200 and the wireless power receiver 300. According to one embodiment, the power transmission state may refer to the distance between the wireless power transmitter 200 and the wireless power receiver 300, and the directions of the wireless power transmitter 200 and the wireless power receiver 300. In other words, the power transmission state may refer to the coupling state between the wireless power transmitter 200 and the wireless power receiver 300.

According to the present invention, the coupling state may be collectively referred to as an index related to the coupling coefficient between a transmission coil and a reception coil due to the distance between the wireless power transmitter 200 and the wireless power receiver 300 and the position relation between the wireless power transmitter 200 and the wireless power receiver 300. In other words, the coupling state according to the present invention may be collectively referred to as all indexes related to a coupling coefficient such as the quantity of current flowing through the wireless power transmitter 200 and the input impedance of the wireless power transmitter 200.

According to one embodiment, the power transmission state may refer to information of the power reception state of the wireless power receiver 300.

In addition, the intensity of current applied to the AC power generating unit 160 may be related to the coupling coefficient between the transmission resonant coil unit 212 of the wireless power transmitter 200 and the reception resonant coil unit 311. The coupling coefficient refers to the degree of the electromagnetic coupling between the transmission resonant coil unit 212 and the reception resonant coil unit 311, and has the range of 0 to 1.

Meanwhile, the control unit 180 determines if the intensity of the measured current is equal to or greater than a threshold value (step S305). According to one embodiment, the threshold value may be 100 mA for the illustrative purpose. The threshold value may refer to the minimum current value required to detect the wireless power receiver 300. In other words, if the intensity of the measured current is equal to or greater than the threshold value, the wireless power receiver 300 is regarded as being detected. If the intensity of the measured current is less than the threshold value, the wireless power receiver 300 is regarded as not being detected.

If the intensity of the measured current is equal to or greater than the threshold value, the control unit 180 decides second output voltage corresponding to the intensity of the measured current (step S307). The control unit 180 may determine the second output voltage by searching for the DC voltage corresponding to the intensity of current applied to the AC power generating unit 160 in the storage unit 170. According to one embodiment, the second output voltage may refer to voltage required to transmit power to the wireless power receiver 300.

Thereafter, the control unit 180 controls the DC-DC converter 130 to apply the decided second output voltage to the AC power generating unit 160 (step S309). The DC-DC converter 130 outputs the second output voltage under the control of the control unit 180 and transmits the second output voltage to the AC power generating unit 160.

Thereafter, the current sensor 270 measures the intensity of current applied to the AC power generating unit 160 again (step S311).

Thereafter, the control unit 180 may determine if the intensity of the measured current is in a preferable current range (step S313). In this case, the preferable current range may refer to a current range corresponding to the second output voltage when the second output voltage is applied to the AC power generating unit 160. The preferable current range may be increased as the second output voltage is increased. As the second output voltage is decreased, the range of the second output voltage may be decreased.

The control unit 180 may search the storage unit 170 for the preferable current range corresponding to the second output voltage, and may determine if the intensity of the measured current is in the preferable current range.

If the intensity of the measured current is in the preferably current range, the control unit 180 stands by for a predetermined time (step S315) and returns to step S311. In other words, the control unit 180 may measure the intensity of current applied to the AC power generating unit 160 and periodically determine if the intensity of the measured current corresponds to the second output voltage applied to the AC power generating unit 160.

Meanwhile, if the intensity of the current measured in step S105 is less than the threshold value, the control unit 180 controls the DC-DC converter 130 to adjust the first output voltage to 0V (step S317).

In other words, if the intensity of the measured current is less than the threshold value, the control unit 180 determines that the wireless power receiver 300 is not detected and thus adjusts the first output voltage to 0V. If the voltage applied to the AC power generating unit 160 is 0V, the wireless power transmitter 200 does not transmit power to the wireless power receiver 300.

Therefore, if the wireless power receiver 300 is not detected, the wireless power transmitter 200 can inhibit meaningless power loss.

Meanwhile, if the first output voltage is adjusted to 0V, the control unit 180 stands by for 0.1 second (step S319). In this case, 0.1 second is provided for the illustrative purpose.

If 0.1 second elapses, the control unit 180 returns to step S301 so that the DC voltage applied to the AC power generating unit 160 is adjusted to the first output voltage.

Meanwhile, if the intensity of current measured in step S313 is not in the preferable current range, the control unit 180 returns to step S307. In other words, the control unit 180 may control the DC-DC converter 130 such that the second output voltage corresponding to the intensity of the current measured in step S113 is applied to the AC power generating unit 160. The intensity of the current measured in step S313 may refer to the power reception state of the wireless power receiver 300.

For example, if the intensity of the current measured in step S313 is measured less than the preferable current range, the distance between the wireless power transmitter 200 and the wireless power receiver 300 may be regarded as being shorter. Accordingly, the control unit 180 may control the DC-DC converter 130 to apply DC voltage, which is more reduced by one level, to the AC power generating unit 160, thereby reducing the quantity of the transmission power transmitted to the wireless power receiver 300.

As described above, according to the method of controlling the power according to the embodiment, the power reception state of the wireless power receiver 300 is detected based on the intensity of current applied to the AC power generating unit 160 and the quantity of the transmission power may be more adjusted in order to transmit the power corresponding to the power reception state. Accordingly, the power transmission efficiency can be maximized and the quantity of the power loss can be reduced.

Figures 12, 13:
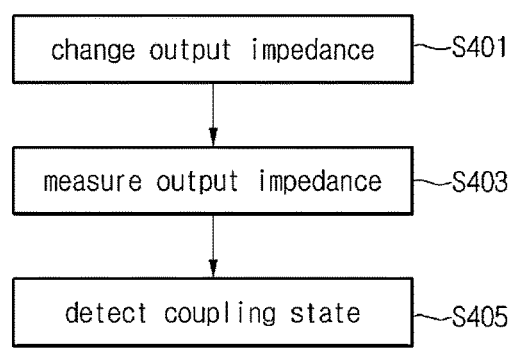
FIG. 12 is a view to explain a look-up table in which a current value when a first output voltage is applied to an AC power generating unit, a coupling coefficient, a second output voltage, and a preferable current range correspond to each other.
FIG. 13 is a flowchart to explain a method of detecting a coupling coefficient according to another embodiment.

FIG. 12 is a view to explain a look-up table in which a current value measured when a first output voltage is applied to an AC power generating unit, a coupling coefficient, a second output voltage, and a preferable current range correspond to each other.

The look-up table of FIG. 12 is stored in the storage unit 17.

If current measured by the power transmission state detecting unit 140 is equal to or greater than 100 mA when the first output voltage is applied to the AC power generating unit 160, the wireless power receiver 300 is regarded as being detected.

The first output voltage may be 12V for the illustrative purpose.

If the current measured by the power transmission state detecting unit 140 is equal to or greater than 120 mA when the first output voltage is applied to the AC power generating unit 160, the coupling coefficient of the transmission resonant coil unit 212 of the wireless power transmitter 200 and the reception resonant coil unit 311 of the wireless power receiver 300 correspond to 0.05. In this case, the control unit 180 determines the wireless power receiver 300 as being away from the wireless power transmitter 200, and controls the DC-DC converter 130 so that the DC voltage applied to the AC power generating unit 160 becomes 28V (second output voltage).

Thereafter, when the DC voltage applied to the AC power generating unit 160 is maintained to 28V, the control unit 180 determines if the current applied to the AC power generating unit 160 satisfies the condition of the preferable current range of 751 mA to 800 mA.

If the current applied to the AC power generating unit 160 is beyond the preferable current range, the first output voltage (12 V) is applied to the AC power generating unit 160 for the measurement of current. If the value of the measured current is 180 mA, the control unit 180 determines the wireless power transmitter 200 as being closer to the wireless power receiver 300 when comparing with the case that the value of the measured current is 120 mA.

Although the distance between the wireless power transmitter 200 and the wireless power receiver 300 has been described in relation to the intensity of current in the above example, various power transmission states such as the directions in which the wireless power transmitter 200 and the wireless power receiver 300 are located may be considered.

As described above, the wireless power transmitter 200 adjusts the power transmitted to the wireless power receiver 300 by taking into consideration various power transmission states such as the distance from the wireless power receiver 300 and the direction in relation to the wireless power receiver 300, thereby maximizing the power transmission efficiency and inhibiting power loss.

Hereinafter, a scheme of detecting a coupling coefficient according to another embodiment will be described with reference to FIGS. 13 to 15 will be described by incorporating the description made with reference to FIGS. 1 to 3.

FIG. 13 is a flowchart to explain the scheme of detecting a coupling coefficient according to another embodiment. FIG. 14 is a view to explain the case that a switch SW is open in order to change output impedance $Z_L$. FIG. 15 is a view to explain the case that the switch SW is shorted in order to change the output impedance $Z_L$.

Hereinafter, a scheme of detecting a coupling coefficient according to another embodiment will be described with reference to FIG. 13.

First, the wireless power receiver 300 changes an output impedance (step S401). The output impedance $Z_L$ may refer to an impedance measured when viewed the load 400 from the reception unit 310. The wireless power receiver 300 may include the switch SW, and may change the output impedance through the switch SW. One terminal of the switch SW is connected to a capacitor $C_4$, and an opposite terminal of the switch SW is connected to one terminal of the load 400. An opposite terminal of the capacitor $C_4$ is connected to the one terminal of the load 400.

Figure 14:
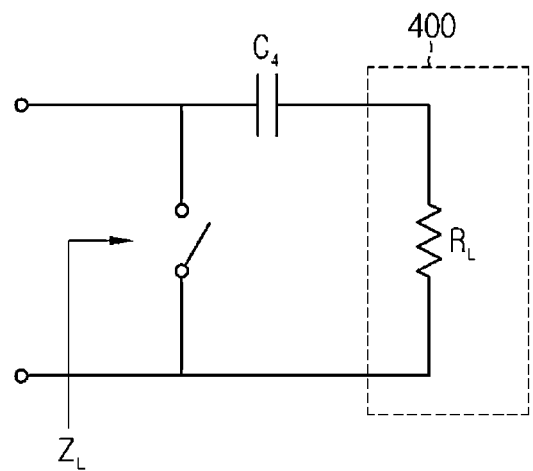
FIG. 14 is a view to explain the case that a switch is open in order to change output impedance.

Referring to FIG. 14, the wireless power receiver 300 transmits an open signal to the switch SW to open the switch SW. If the switch SW is open, the output impedance $Z_L$ may be expresses as Equation 25.

$$Z_L = R_L + \frac{1}{j\omega C_4} \qquad \text{Equation 25}$$

If resistors $R_2$ and $R_3$ are decided to 0Ω on the assumption that the resistors $R_2$ and $R_3$ have very small values in Equation 1, Equation 3, and Equation 5, and the values of the transmission induction coil $L_1$ and the capacitor $C_1$, the transmission resonant coil $L_2$ and the capacitor $C_2$, the reception resonant coil $L_3$ and capacitor $C_3$, and the reception induction coil $L_4$ and the capacitor $C_4$ are set in such a manner that all of the above coils and the capacitors make resonance at the resonance frequency co, the first input impedance Z1 in Equation 5 may be arranged as Equation 26.

$$Z_1 = \frac{M_1^2 M_3^2}{M_2^2} \frac{\omega^2}{Z_L + j\omega L_4} \qquad \text{Equation 26}$$

Equation 26 may be arranged as following Equation 27 by using Equation 2, Equation 4, and Equation 6.

$$Z_1 = \frac{k_1^2 k_3^2}{k_2^2} \frac{\omega^2 L_1 L_4}{Z_L + j\omega L_4} \qquad \text{Equation 27}$$

If the values of the reception induction coil $L_4$ and the capacitor $C_4$ are decided so that the reception induction coil $L_4$ and the capacitor $C_4$ make resonance at the resonance frequency ω, and the output impedance $Z_L$ is substituted into Equation 27, the first input impedance $Z_1$ is arranged as following Equation 28.

$$Z_1 = \frac{k_1^2 k_3^2}{k_2^2} \frac{\omega^2 L_1 L_4}{R_L} \qquad \text{Equation 28}$$

Figure 15:
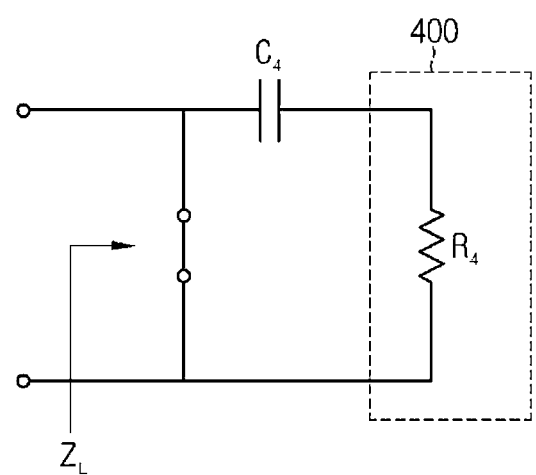
FIG. 15 is a view to explain the case that the switch is shorted in order to change the output impedance.

Referring to FIG. 15, the wireless power receiver 300 shorts the switch SW by transmitting a short signal. If the switch SW is shorted, the output impedance $Z_L$ becomes 0, and the first input impedance $Z_1$ is arranged as Equation 29.

$$Z_1 = \frac{k_1^2 k_3^2}{k_2^2}(-j\omega L_1) \qquad \text{Equation 29}$$

The wireless power receiver 300 may short the switch SW for a predetermined time at a predetermined period by applying the control signal to the switch SW. The period may be 1 second, and the predetermined time may be 100 us for the illustrative purpose.

Thereafter, the detection unit 220 measures the input impedance (Step S403). According to one embodiment, the detection unit 220 may measure the first input impedance $Z_1$ by using current and voltage input to the wireless power transmitter 220 from the power supply device 100.

Thereafter, the detection unit 220 may detect the coupling coefficient between the transmission resonant coil $L_2$ of the transmission unit 210 and the reception resonant coil $L_3$ of the reception unit 310 by using the measured input impedance (step S405). In other words, referring to Equation 29 and Equation 30, since all variables other than the coupling coefficient $K_2$ have fixed values, the coupling coefficient $K_2$ may be detected if the first input impedance $Z_1$ is measured.

Hereinafter, a method of controlling power according to still another embodiment will be described with reference to FIGS. 16 to 17.

Figure 16:
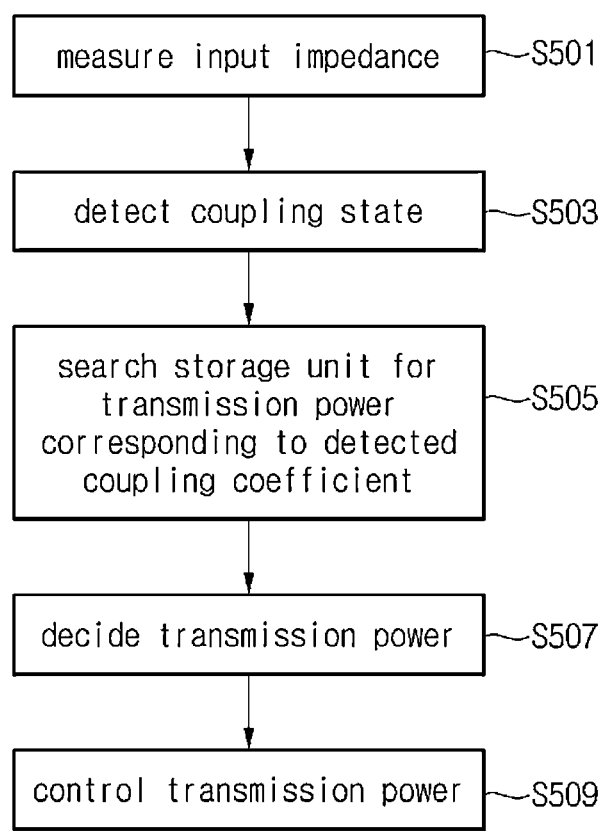
FIG. 16 is a flowchart to explain a method of controlling power according to still another embodiment.

FIG. 16 is a flowchart to explain the method of controlling power according to still another embodiment. FIG. 17 is a view to explain a look-up table used in the method of controlling power according to the embodiment of FIG. 16.

Referring to FIG. 16, the wireless power transmitter 200 measures the input impedance (step S501).

The detection unit 220 detects the coupling coefficient between the transmission resonant coil unit 212 and the reception resonant coil unit 311 by using the measured input impedance (step S503). Since the scheme of detecting the coupling coefficient is the same as that described with reference to FIGS. 3 and 13, the details of the scheme of detecting the coupling coefficient is omitted.

The wireless power transmitter 200 searches for transmission power corresponding to the detected coupling coefficient (step S505). The storage unit 170 of the wireless power transmitter 200 stores transmission power according to the coupling coefficient in correspondence to the coupling coefficient in the form of a look-up table. The wireless power transmitter 200 searches the storage unit 170 for the transmission power corresponding to the detected coupling coefficient.

The look-up table will be described with reference to FIG. 17.

Referring to FIG. 17, a look-up table in which a distance, input test current, a coupling coefficient, load impedance, reception power, power transmission efficiency and transmission power correspond to each other can be shown.

In this case, the distance may refer to the distance between the wireless power transmitter 200 and the wireless power receiver 300. In detail, the distance between the wireless power transmitter 200 and the wireless power receiver 300 may be the distance between the transmission resonant coil unit 212 and the reception resonant coil unit 311 shown in FIG. 2. Referring to FIG. 17, as the distance between the wireless power transmitter 200 and the wireless power receiver 300 is longer, the coupling coefficient may be reduced.

The input test current is current applied to the wireless power transmitter 200.

The power transmission efficiency may refer to the power transmission efficiency between the wireless power transmitter 200 and the wireless power receiver 300, or the power transmission efficiency between the wireless power transmitter 200 and the load 400.

The load impedance may refer to impedance of the load 400 to obtain the maximum power transmission efficiency. It may be recognized that the relation between the load impedance and the coupling coefficient is the same as the characteristic of the graph shown in FIG. 4.

The reception power is power received by the load 400. The reception power represents power that the load 400 must receive in order to obtain the maximum power transmission efficiency.

The transmission power is power that must be transmitted from the wireless power transmitter 200 to the wireless power receiver 300 in order to obtain the maximum power transmission efficiency.

The wireless power transmitter 200 may search the look-up table for the transmission power corresponding to the detected coupling coefficient.

The wireless power transmitter 200 may decide the transmission power obtained through the search as the transmission power to be transmitted to the load 400 (step S507). In other words, the wireless power transmitter 200 may decide the transmission power corresponding to the detected coupling coefficient to obtain the maximum power transmission efficiency.

The wireless power transmitter 200 controls the transmission power in order to transmit the decided transmission power to the load 400 (step S509). According to one embodiment, the wireless power transmitter 200 may use a scheme of controlling the transmission power by controlling the power supply device 500 that supplies power to the power supply device 100, and the details thereof has been described with reference to FIGS. 9 and 10.

According to still another embodiment, the wireless power transmitter 200 may control the transmission power by measuring current flowing inside the wireless power transmitter 200, and the details thereof have been described with reference to FIGS. 11 and 12.

According to a scheme of controlling power of still another embodiment, since the transmission power can be determined through the detection of the coupling coefficient and the search of the storage unit, the configuration of components is simple, and the procedure of controlling power is simple.

The method of controlling power according to the embodiment may be realized in the form of a program executed in a computer and stored in a computer-readable medium. The computer-readable recording medium includes a ROM, a RAM, a CD-ROM, a magnetic tape, a floppy disk, and an optical data storage device. Further, the computer-readable recording medium may be implemented in the form of a carrier wave (for example, transmission through Internet).

The computer-readable recording medium may be distributed in computer systems connected with each other through a network and a code which is readable by a computer in a distribution scheme may be stored and executed in the computer-readable recording medium. A functional program, a code and code segments for implementing the method may be easily deduced by programmers skilled in the related art.

What is claimed is:

1. A wireless power transmitter comprising:
   a detection circuit configured to detect a coupling coefficient between the wireless power transmitter and a wireless power receiver connected to a load; and
   a transmission coil configured to transmit a first transmission power to a reception coil of the wireless power receiver;
   wherein the wireless power transmitter is configured to determine a load impedance of the load based on the detected coupling coefficient to maximize power transfer efficiency,
   wherein the wireless power transmitter is configured to determine a reception power based on the determined load impedance,
   wherein the wireless power transmitter is configured to determine a second transmission power based on the determined reception power, and
   wherein the wireless power transmitter is configured to adjust the first transmission power to the determined second transmission power, and the transmission coil is configured to transmit the second transmission power to the reception coil, the second transmission power being received by the load of the wireless power receiver as the reception power.

2. The wireless power transmitter of claim 1, wherein the wireless power transmitter determines a second reception power, which is presently received by the load, and controls the transmission power such that the first reception power is transmitted to the load if the second reception power is different from the first reception power.

3. The wireless power transmitter of claim 2, wherein the wireless power transmitter determines the second reception power by detecting the coupling coefficient.

4. The wireless power transmitter of claim 3, wherein the wireless power transmitter determines the second reception power through in-band communication or out-of-band communication with the wireless power receiver.

5. The wireless power transmitter of claim 1, wherein the detection circuit is configured to measure an input impedance obtained, the input impedance obtained as an impedance that is viewed from the power supply device to the wireless power transmitter, and wherein the detection circuit is further configured to detect the coupling coefficient based on the measured input impedance.

6. The wireless power transmitter of claim 5, wherein the detection circuit detects the coupling coefficient by measuring an input impedance of the wireless power transmitter after fixing an output impedance of the wireless power receiver.

7. The wireless power transmitter of claim 5, further comprising a storage circuit configured to store the reception power, the maximum power transfer efficiency corresponding to the coupling coefficient, and the second transmission power, and
wherein the wireless power transmitter is configured to search for the second transmission power corresponding to the detected coupling coefficient to transmit the searched second transmission power to the wireless power receiver.

8. The wireless power transmitter of claim 1, wherein the power supply device receives DC power from a power supply circuit to output the AC power, and
wherein the wireless power transmitter controls the transmission power by adjusting the AC power output from the power supply device.

9. The wireless power transmitter of claim 8, wherein the power supply device transmits a power control signal to control the DC power output from the power supply circuit through power line communication.

10. The wireless power transmitter of claim 1, wherein the power supply device comprises an AC power generating circuit to generate the AC power by receiving DC power from a power supply circuit, and
wherein the wireless power transmitter determines the coupling coefficient based on an intensity of current input to the AC power generating circuit or output from the AC power generating circuit and controls the transmission power according to the determined coupling coefficient.

11. The wireless power transmitter of claim 1, further comprising a power supply device comprising a power transmission state detecting circuit and a control circuit,
wherein the power transmission state detecting circuit is configured to detect a coupling state between the wireless power transmitter and the wireless power receiver based on a distance between the wireless power transmitter and the wireless power receiver or positions of the wireless power transmitter and the wireless power receiver, and
wherein the control circuit is configured to receive a signal from the power transmission state detecting circuit and to adjust output voltage.

12. The wireless power transmitter of claim 1, further comprising a power transmission state detecting circuit and a control circuit,
wherein the power transmission state detecting circuit comprises a current sensor configured to measure intensity of current flowing through the wireless power transmitter,
wherein the control circuit is configured to determine a distance between the wireless power transmitter and the wireless power receiver based on the intensity of current measured by the current sensor and to determine a DC voltage to be received from the power supply device.

13. A method of controlling power of a wireless power transmitter, the method comprising:
detecting, by a detection circuit, a coupling coefficient between the wireless power transmitter and a wireless power receiver connected to a load;
transmitting, by a transmission coil, a first transmission power to a reception coil of the wireless power receiver;
determining, by the wireless power transmitter, a load impedance of the load based on the detected coupling coefficient to maximize power transfer efficiency;
determining, by the wireless power transmitter, a reception power based on the determined load impedance;
determining, by the wireless power transmitter, a second transmission power based on the determined reception power;
controlling transmission power by adjusting, by the wireless power transmitter, the first transmission power to the determined, second transmission power; and
transmitting, by the transmission coil, the second transmission power to the reception coil, the second transmission power being received by the load of the wireless power receiver as the reception power.

14. The method of claim 13, wherein the determining of the second transmission power comprises determining the second transmission power by searching a storage circuit to store the reception power, the maximum power transfer efficiency being based on the coupling coefficient.

15. The method of claim 13, wherein the detecting of the coupling coefficient comprises detecting the coupling coefficient by using an input impedance of the wireless power transmitter.

16. A wireless power transmitter comprising:
a detection circuit configured to detect a coupling coefficient between the wireless power transmitter and a wireless power receiver connected to a load; and
a transmission coil configured to transmit a first transmission power to a reception coil of the wireless power receiver;
wherein the wireless power transmitter is configured to determine a load impedance of the load based on the detected coupling coefficient to maximize power transfer efficiency,
wherein the wireless power transmitter is configured to determine the maximized power transfer efficiency based on the coupling coefficient,
wherein the wireless power transmitter is configured to determine a reception power based on the determined load impedance,
wherein the wireless power transmitter is configured to determine a second transmission power based on the determined first reception power in consideration of the maximized power transfer efficiency, and wherein the wireless power transmitter is configured to adjust the first transmission power to the determined second transmission power, and the transmission coil is configured to transmit the second transmission power to the reception coil, the second transmission power being received by the load of the wireless power receiver as the reception power.

* * * * *